United States Patent [19]

Scheffler

[11] Patent Number: 5,502,601
[45] Date of Patent: Mar. 26, 1996

[54] HIGH SPEED RECORDED INFORMATION DUPLICATING EQUIPMENT

[75] Inventor: Robert G. Scheffler, Wheaton, Ill.

[73] Assignee: Magic Music Cassette Company, Wheeling, Ill.

[21] Appl. No.: 338,899

[22] Filed: Nov. 14, 1994

Related U.S. Application Data

[63] Continuation of Ser. No. 709,714, Jun. 3, 1991, Pat. No. 5,365,381, which is a continuation-in-part of Ser. No. 253,067, Oct. 4, 1988, Pat. No. 5,021,893, which is a continuation-in-part of Ser. No. 133,936, Dec. 17, 1987, Pat. No. 5,041,921, which is a continuation-in-part of Ser. No. 874, Jan. 6, 1987, abandoned.

[51] Int. Cl.$^6$ .............................. G11B 3/64; G11B 5/86; G11B 7/28; G11B 20/00
[52] U.S. Cl. .................... 360/32; 360/15; 369/85
[58] Field of Search .................... 360/13, 15, 16, 360/17, 32, 39; 369/8, 84, 85; 341/144, 145, 146, 147

[56] References Cited

U.S. PATENT DOCUMENTS

| | | | |
|---|---|---|---|
| 4,227,220 | 10/1980 | Brown et al. | 360/15 |
| 4,320,486 | 3/1982 | Cooley et al. | 369/14 |
| 4,355,338 | 10/1982 | Yamamoto | 360/15 |
| 4,375,655 | 3/1983 | Korth et al. | 360/15 |
| 4,410,917 | 10/1983 | Newdoll et al. | 360/15 |
| 4,528,643 | 7/1985 | Freeny, Jr. | 364/900 |
| 4,620,158 | 10/1986 | Yasukawa | 360/29 X |
| 4,654,799 | 3/1987 | Ogaki et al. | 364/479 |
| 4,682,248 | 7/1987 | Schwartz | 360/32 |
| 4,703,465 | 10/1987 | Parker | 360/15 X |
| 4,707,750 | 11/1987 | Anderson et al. | 360/15 X |
| 4,766,581 | 8/1988 | Korn et al. | 369/30 |
| 4,786,983 | 11/1988 | Massari | 360/13 |
| 4,811,325 | 3/1989 | Sharples, Jr. et al. | 360/15 X |
| 4,835,682 | 5/1989 | Kurachi et al. | 360/15 X |
| 4,899,230 | 2/1990 | Sherritt | 360/15 |
| 5,021,893 | 6/1991 | Scheffler | 360/15 |
| 5,041,921 | 8/1991 | Scheffler | 360/13 |
| 5,233,477 | 8/1993 | Scheffler | 360/15 |
| 5,365,381 | 11/1994 | Scheffler | 360/15 |

FOREIGN PATENT DOCUMENTS

| | | |
|---|---|---|
| 58-130414 | 8/1983 | Japan . |
| 60-050626 | 3/1985 | Japan . |
| 62-202332 | 9/1987 | Japan . |
| 1581966 | 12/1980 | United Kingdom . |
| 2103865 | 2/1983 | United Kingdom . |
| 2137401 | 10/1984 | United Kingdom . |

OTHER PUBLICATIONS

Excerpts from Intel Corporation, "Component Data Catalog 1980", pp. 2–22 and 8–11 through 8–17.

*Primary Examiner*—David Mis
*Attorney, Agent, or Firm*—Welsh & Katz, Ltd.

[57] ABSTRACT

A customized album recording system is under the control of a central microprocessor or mini-computer. A master library or storage medium is filled with a repertoire of recorded information items (such as musical selections) which may originate with any suitable source, such as phonograph records, tapes, sound tracks, compact discs, or the like. Each information item is stored in the library under its own address. On read out, an operator keys in the addresses identifying the selected items which are read out of the library medium and stored in a large capacity memory, usually to provide about forty-five minutes of total listening time. Then, all of the music is read out of that large capacity memory and recorded at a high speed onto a suitable album size medium, such as a tape cassette, for example. The source music and the customized album music are usually recorded in an analog form. The music which is processed within the system is in a digital form. Thus, the various transfers of music from the master storage to the recorded album, may be accomplished at a high speed of digital transmission. In an alternative embodiment, instead of reading out an entire album amount of recorded information items, the central computer successively reads out limited amounts of data on a demand and fetch basis. A computer provides both the analog-to-digital and the digital-to-analog conversions in order to improve fidelity.

1 Claim, 20 Drawing Sheets

UNIT FOR RETRIEVING FROM A MASTER LIBRARY

UNIT FOR STORING INTO A MASTER LIBRARY

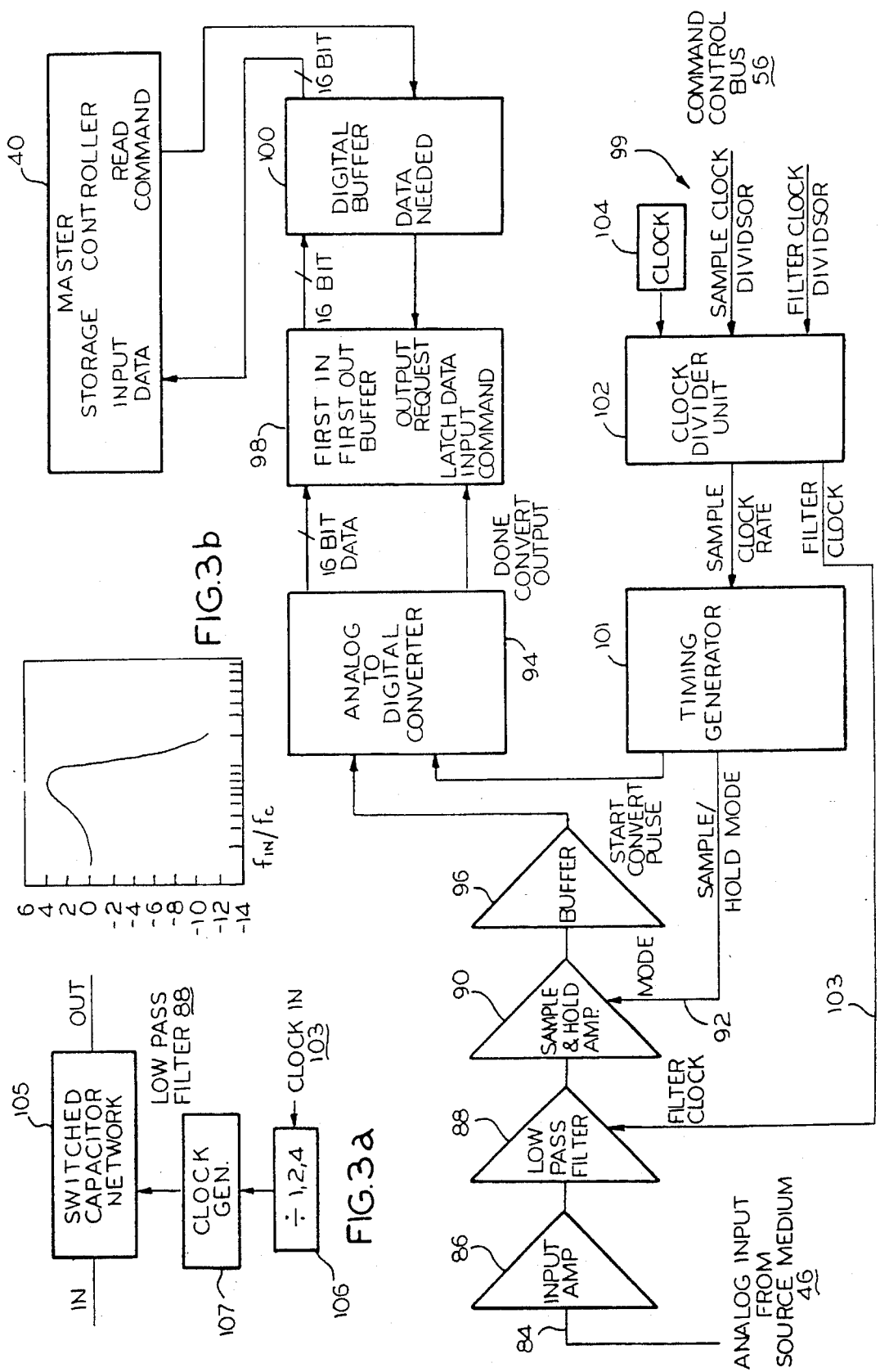

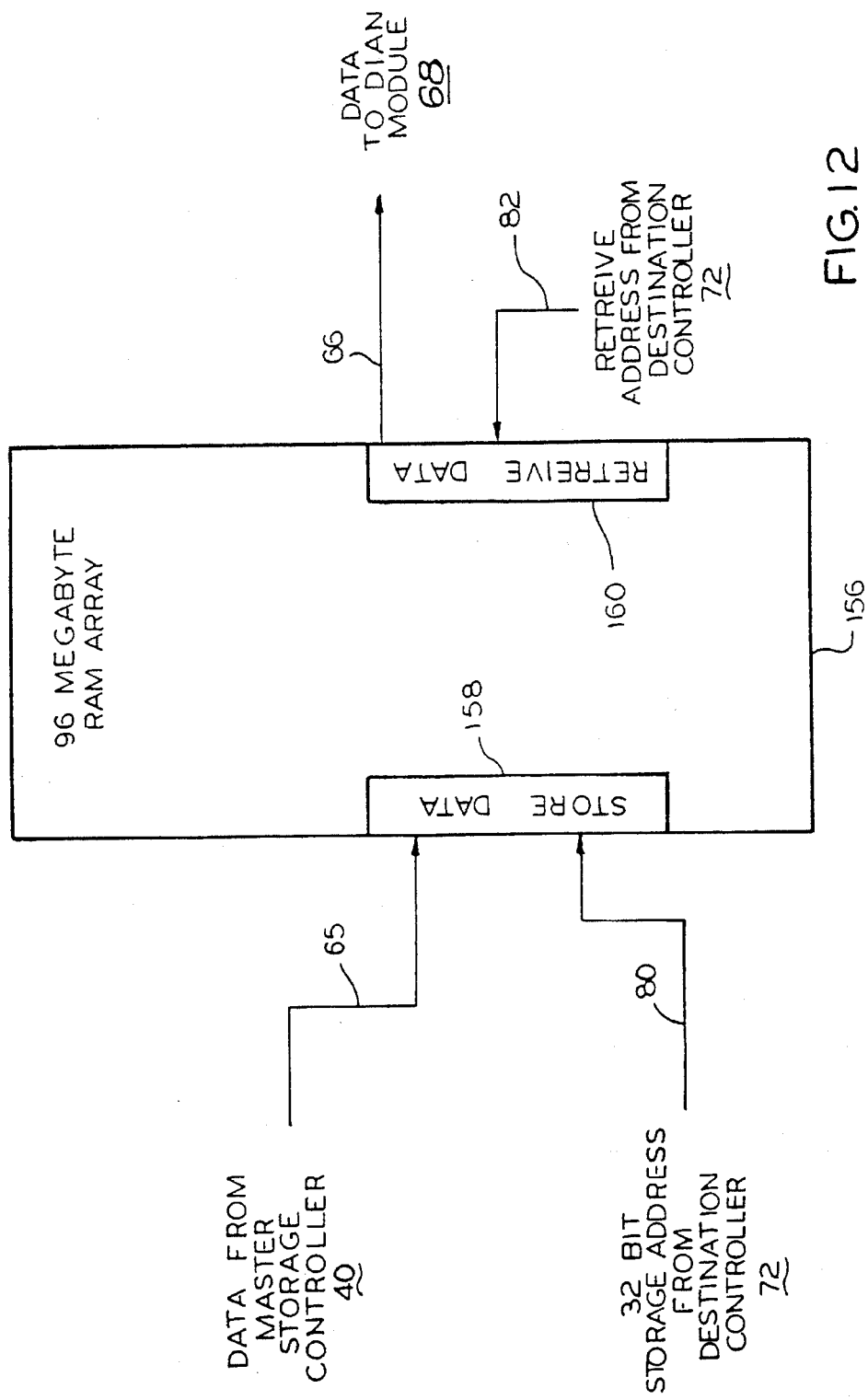

— BEST CASE PCM (LAYER 5)
— WORST CASE PCM (LAYER 6)
  BEST CASE MULTI (LAYER 4)
  WORST CASE MULTI (LAYER 10)

BEST CASE PCM (LAYER 5)
  WORST CASE PCM (LAYER 6)
— BEST CASE MULTI (LAYER 4)
— WORST CASE MULTI (LAYER 10)

FLOW CHART FOR
REQUEST COUNTROL
LOGIC OF FIG. 21

FLOW CHART FOR
BUS CONTROL LOGIC
OF FIG. 21

FLOW CHART FOR REQUEST
CONTROL LOGIC OF FIG. 24

FLOW CHART FOR BUS
CONTROL LOGIC OF FIG. 24

INTERMEDIATE BUFFER STORAGE 64

FLOW CHART
FOR INTERMEDIATE
BUFFER CIRCUIT
OF FIG. 27

HIGH SPEED RECORDED INFORMATION DUPLICATING EQUIPMENT

This is a continuation of Ser. No. 07/709,714 filed Jun. 3, 1991, now U.S. Pat. No. 5,365,381, which is a continuation-in-part of Ser. No. 07/253,067, filed Oct. 4, 1988, now U.S. Pat. No. 5,021,893 which is a continuation-in-part of Ser. No. 07/133,936, filed Dec. 17, 1987, now U.S. Pat. No. 5,041,921, which is a continuation-in-part of Ser. No. 07/000,874, filed Jan. 6, 1987, now abandoned.

This invention relates to recording systems and more particularly to systems for custom recording "tape cassettes or other recording media by recording a number of specific selections taken from a repertoire of selections which is stored in a library or libraries.

For convenience of expression, this specification may refer to music, tape, libraries, albums and the like However, it should be understood that these and similar expressions should be construed broadly enough to cover all equivalent items and structures. For example, the recorded information may be, not only music, but also a recorded foreign language lesson, poetry, telemetry, sound effects, or any other suitable items. The recording media could be tape, records, compact discs, optical tracks on film, or the like. The "library" could be any suitable data base, including satellite, slave or other distributed libraries. For example, each recording company may have a remote library of its musical selections which the inventive recorder may reach via a telecommunication network. The term "album" is used herein to mean a certain batch amount of recorded information items, regardless of whether the items are music, voice, or some other material. Long play records and tape cassettes are examples of albums; however, there may also be other examples.

One example of the invention is found in the recording industry which issues "singles" and "albums". If singles are played, the listener hears exactly what he wants to hear, but he has to continuously change records or tapes, which is a bother. On the other hand, if an album is played, the listener usually likes one or two of the many selections which are recorded thereon and is indifferent to or positively dislikes the remaining selections in the album. The alternative is to buy expensive play back equipment which can pick one of many selections in an album. However, this, in effect, reduces the album to one or two singles with all of the same problems that singles present.

Within a few years after a recording is first made, it is "cut out" of the music catalogs which list the records that are then being offered to the general public. After it becomes a "cut out", the musical selection may be included in albums at a very low cost, and often is offered as a special issue to a select audience, such as the listeners of a TV station, but the question of taste remains and not all of the records are enjoyable to everyone. After a few more years, recorded music tends to become unavailable at any cost. Then, those who are in their nostalgia years do not have the option of playing a recently acquired record containing the music of their youth.

Thus, there are many reasons why there is a need for a system which enables one to select only his favorite music for inclusion in a custom recorded album. This way, everyone may then have a customized album of selections of his own taste which may be totally different from the albums which anyone else may select.

U.S. Pat. No. 4,410,917 has a capability of recording from a master medium onto a slave medium but it does not provide a random selection capability and does not provide a sufficient flexibility. The structure of this patent can not rearrange, edit, or modify the stored information items. It is strictly a duplicator of recorded media.

A desirable kind of master-slave recording system is one which might eventually become almost as commonplace as record stores. Still, the growth of such an industry may be relatively slow; therefore, the same system should also be adaptable to use in a single central location where custom recorded albums are made for distribution via the mail.

Accordingly, an object of this invention is to provide new and improved means for and methods of distributing recorded music. Here, an object is to provide systems for preparing customized recorded albums containing only recorded information selected by an individual.

In keeping with an aspect of the invention, these and other objects are accomplished under the control of a microprocessor or mini-computer. A master library, libraries, data base or storage medium contain recorded information which may originate from any suitable source, such as phonograph records, tapes, sound tracks, compact discs, telemetry sources, or the like. Each recorded information item in the library is stored under its own address. On read out, an operator keys in the addresses identifying the selected recorded information item. The selected items are read out of the library medium and stored in a large capacity memory, usually to provide a total of about forty-five minutes of listening time. Then, all of the items are read out of that large capacity memory and recorded at a high speed onto a suitable album size medium, such as a tape cassette, for example. The various transfers of recorded information items from the master storage to the recorded album, may be accomplished at a high speed.

An embodiment of the invention is shown in the attached drawings, wherein:

FIG. 3 is a block diagram of a first embodiment of an analog-to-digital module for converting the analog source music into digital data for processing within the inventive system;

FIG. 3a is a block diagram of a low pass filter used in the ANDI and the DIAN modules;

Figure 2:
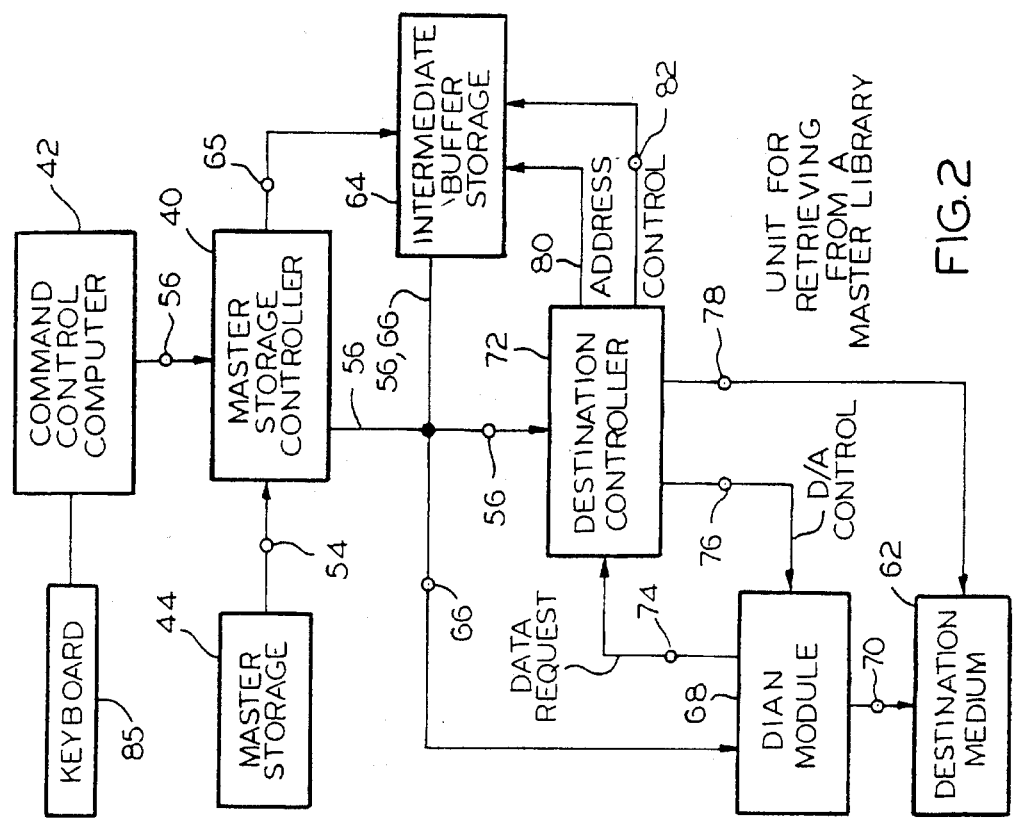
FIG. 2 is a block diagram of the inventive system for retrieving recorded information items from the master library.
Figure 1:
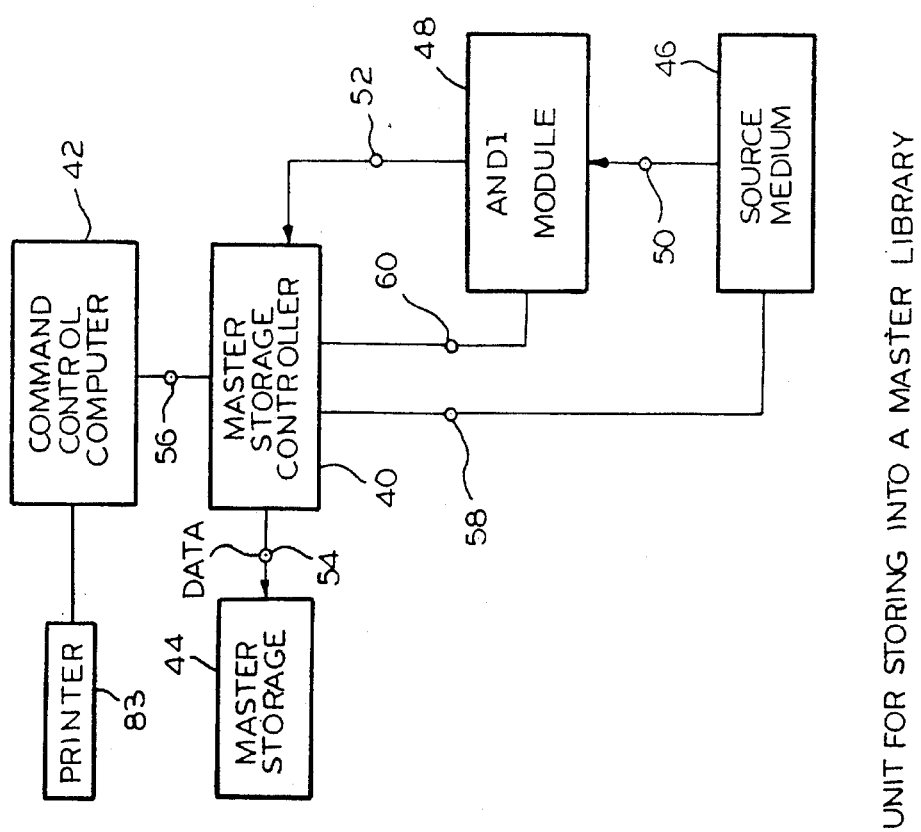
FIG. 1 is a block diagram of a first embodiment of the inventive system for storing recorded information items, such as musical selections, for example, in a master library.
Figure 4:
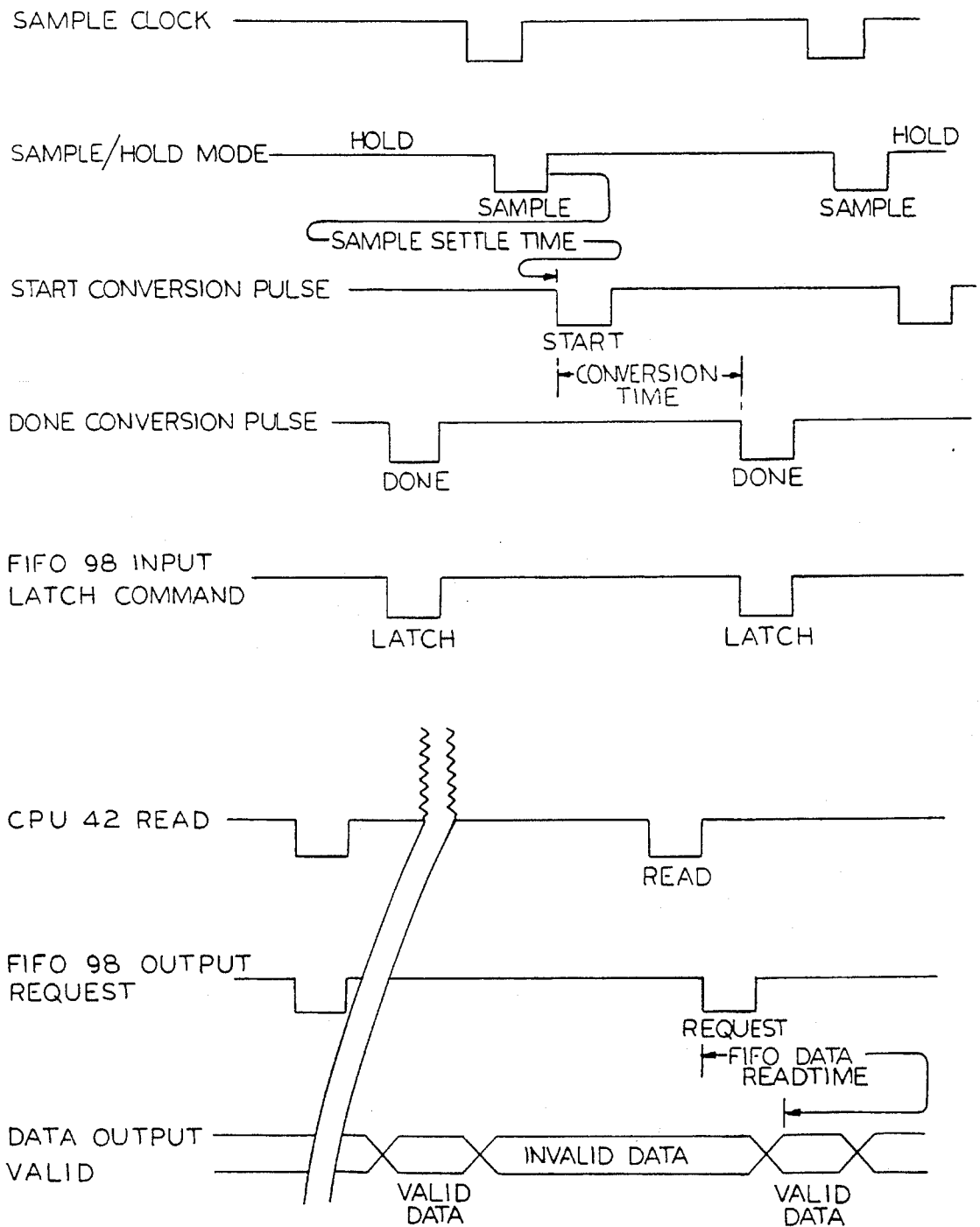
Figure 5:
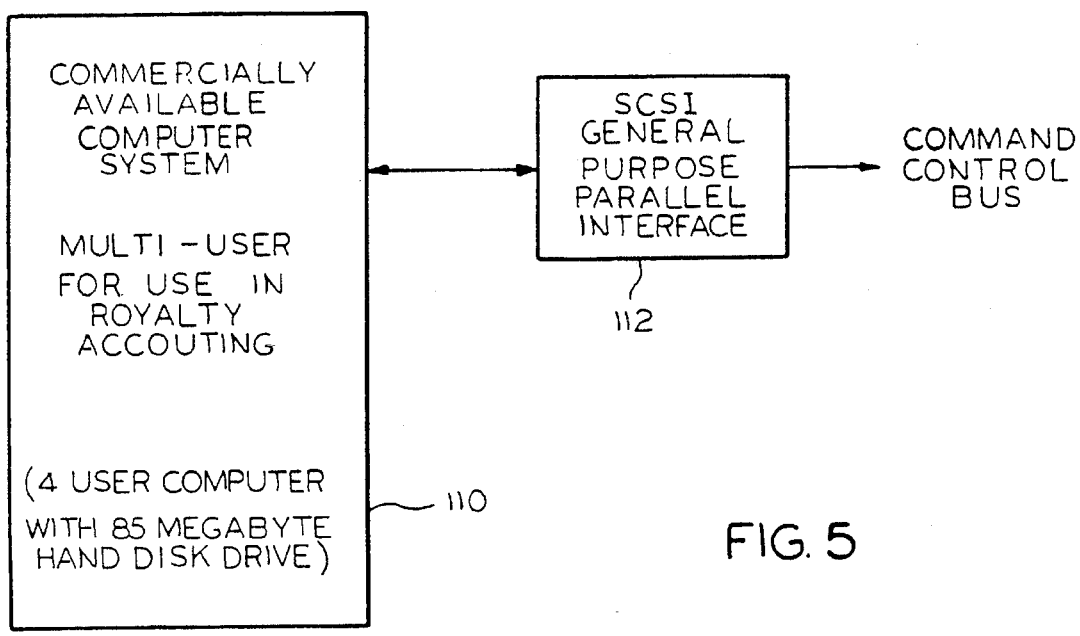
Figure 6:
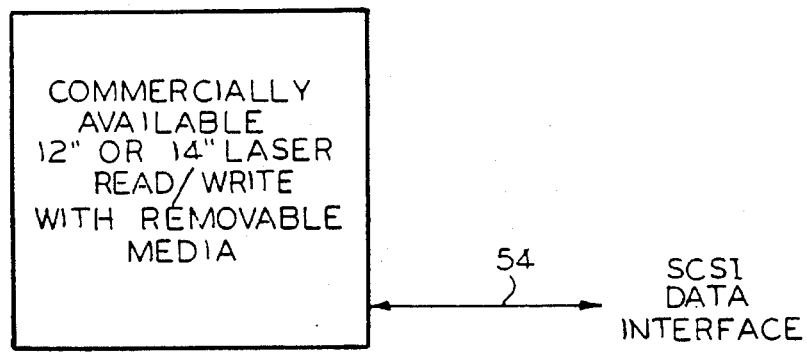
Figure 7:
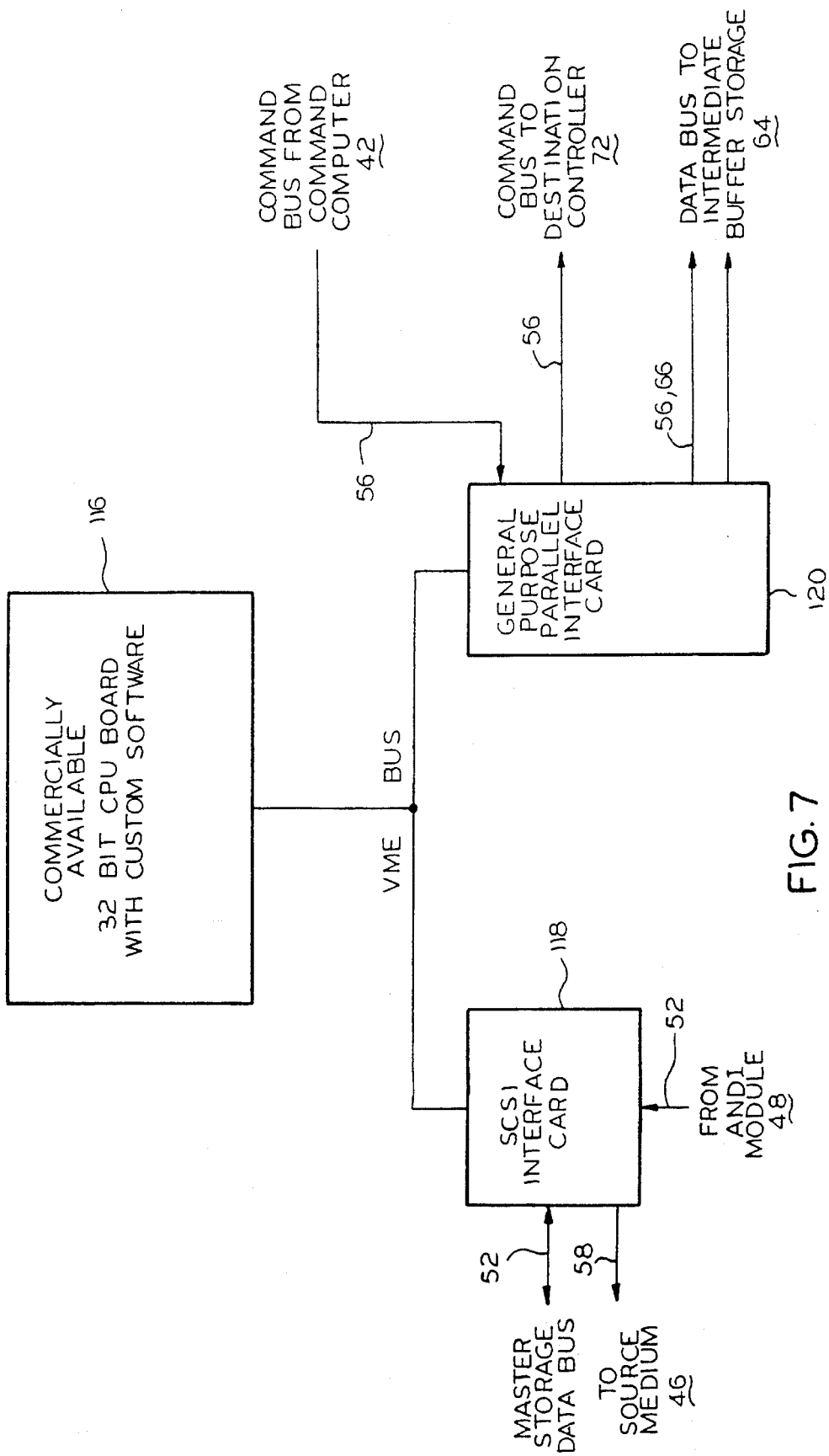
Figure 8:
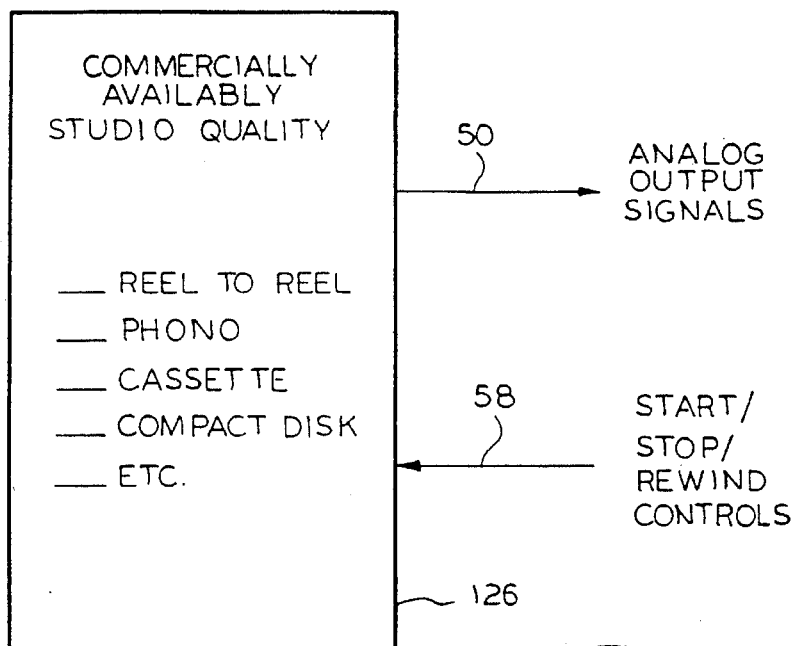
Figure 13:
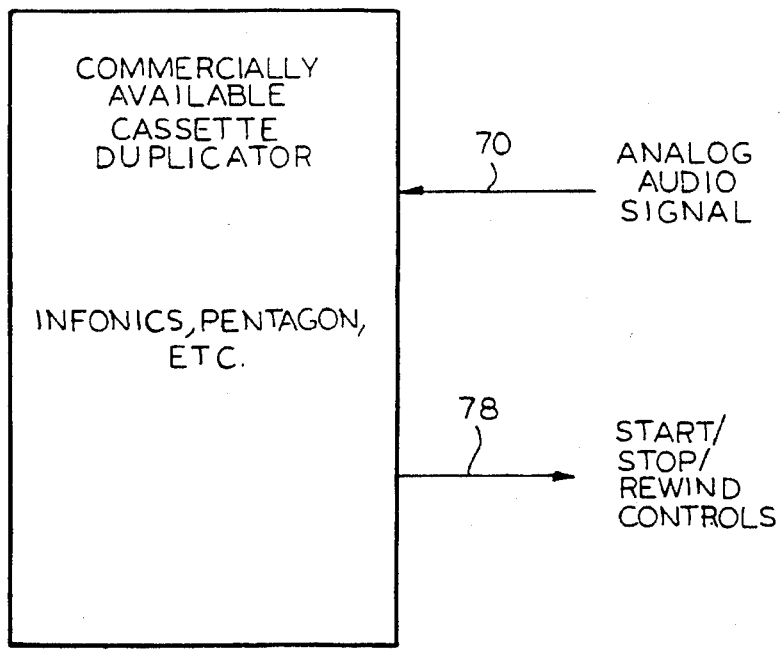
Figure 9:
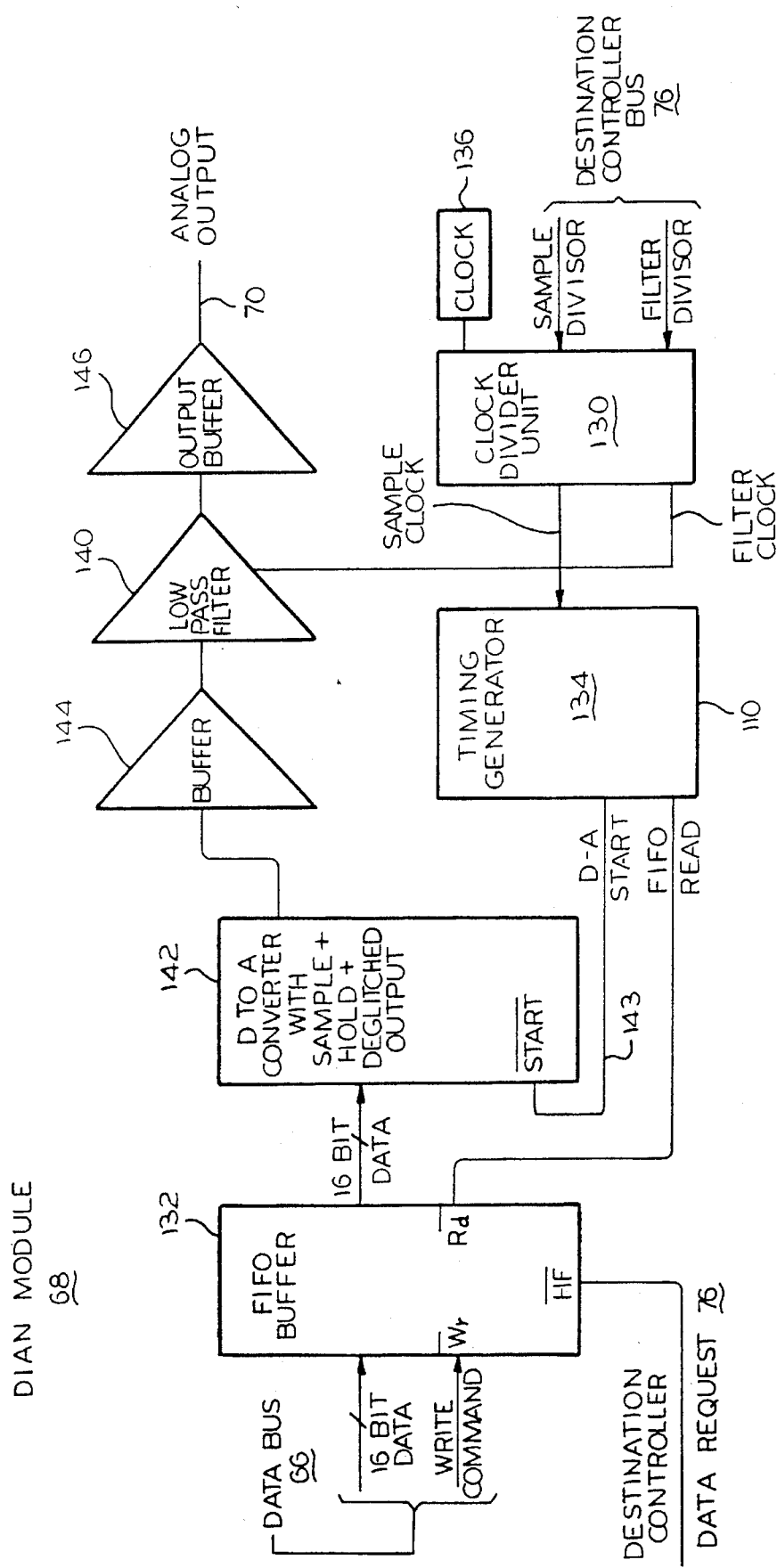
Figure 10:
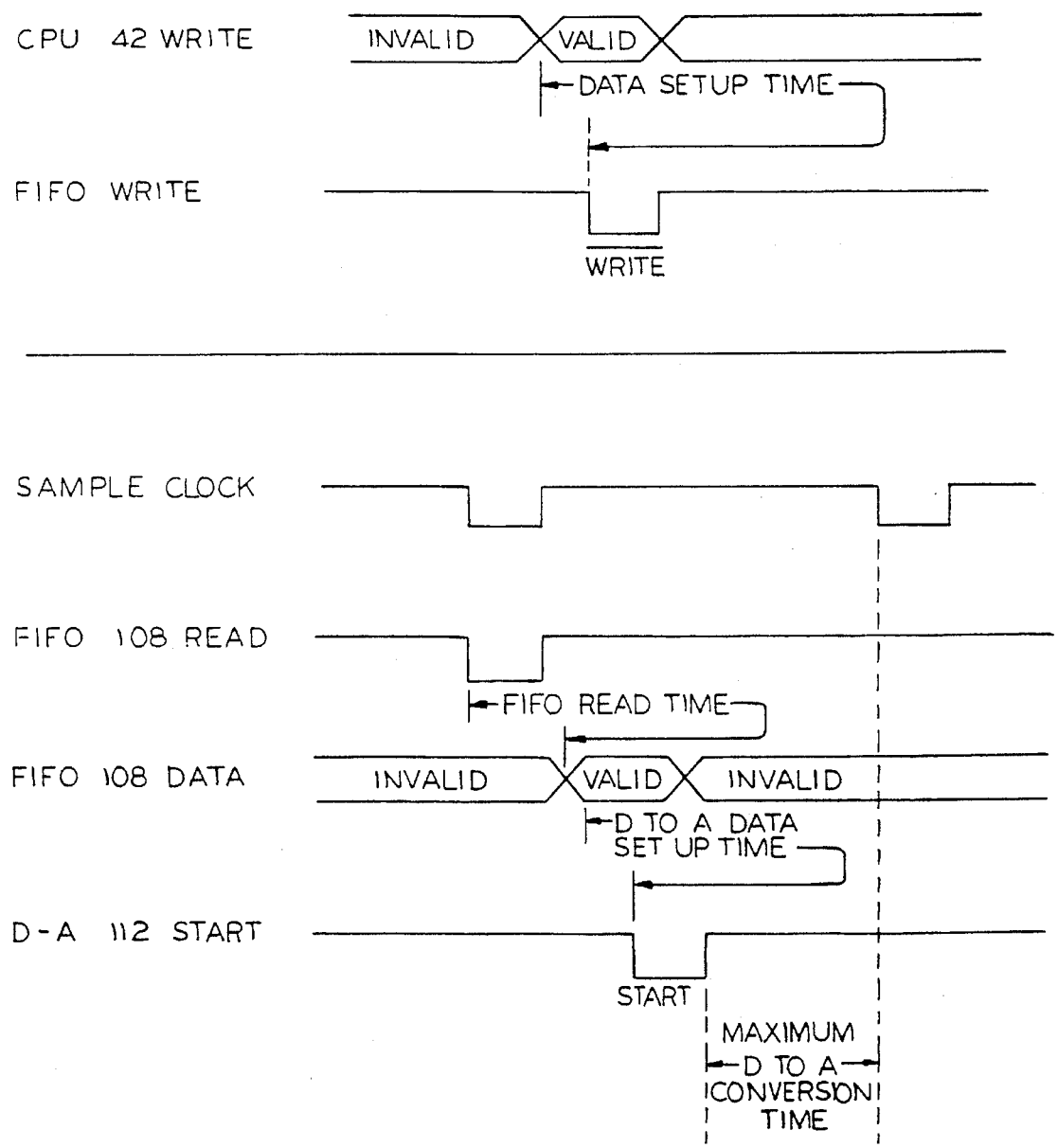
Figure 11:
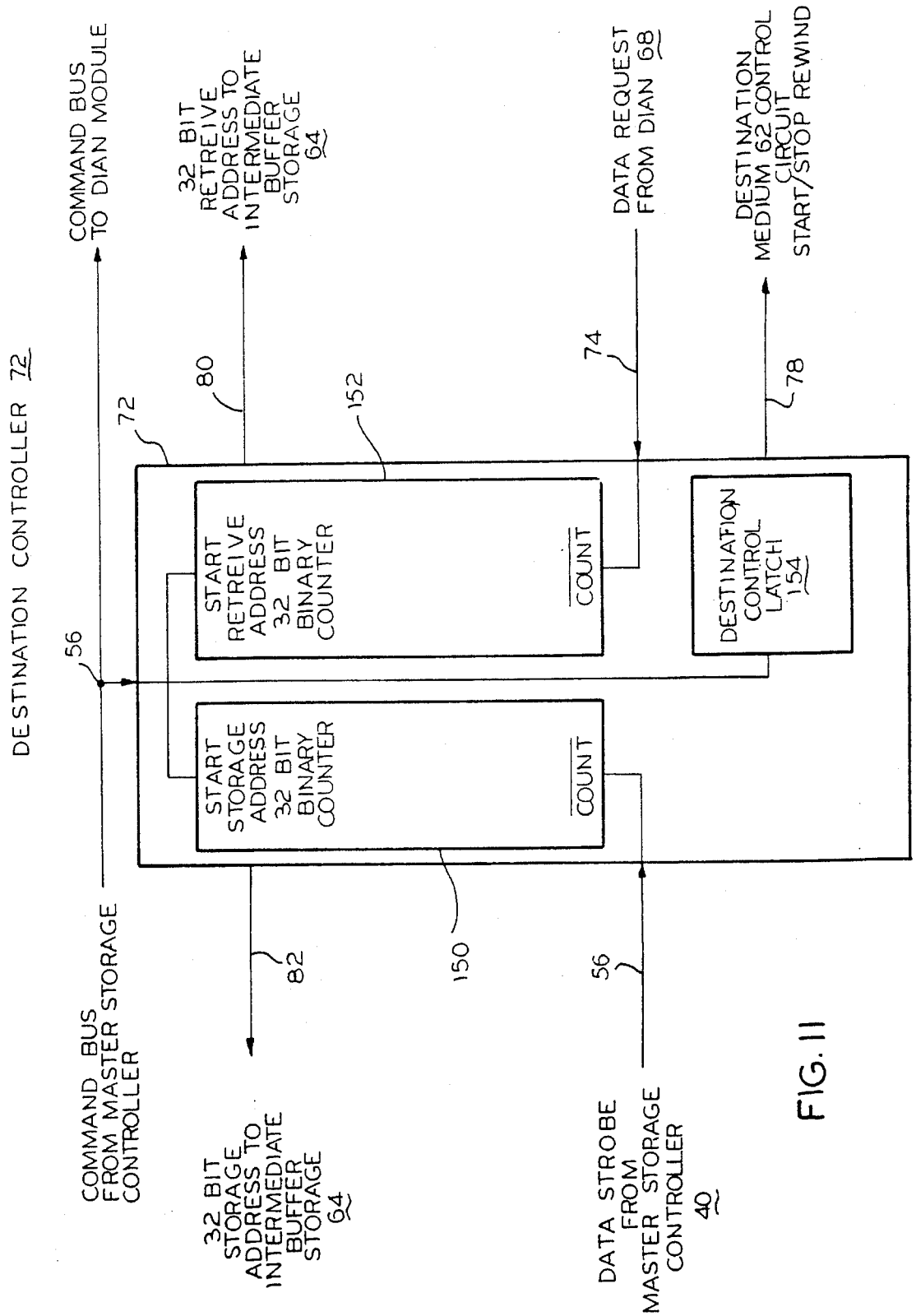
Figure 14:
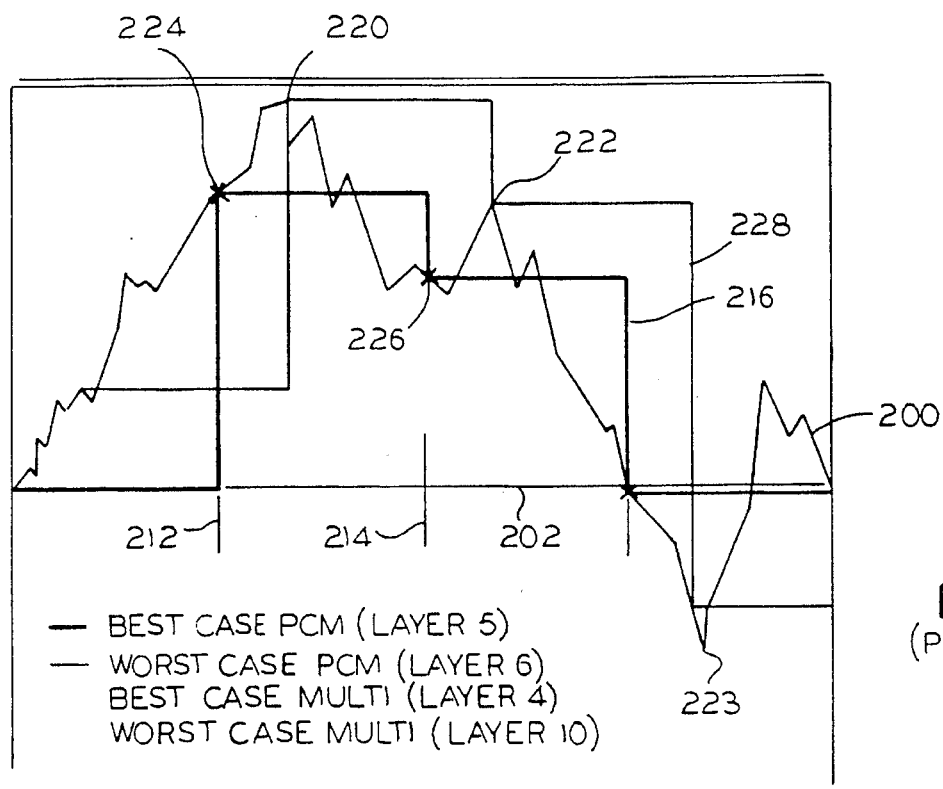
Figure 15:
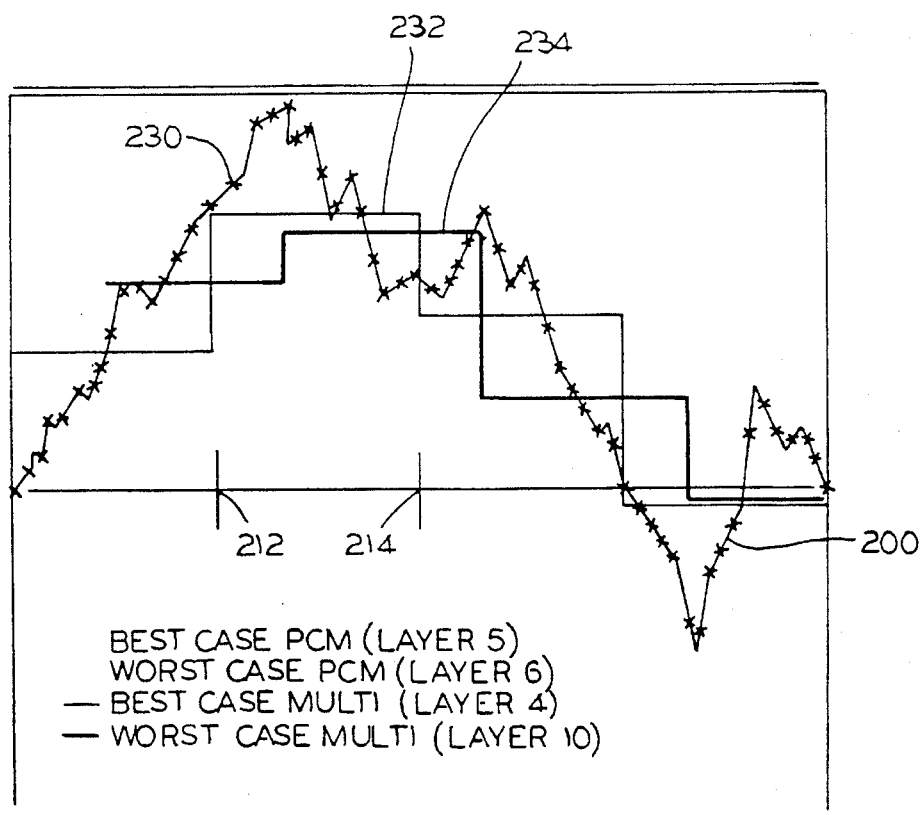
Figure 17:
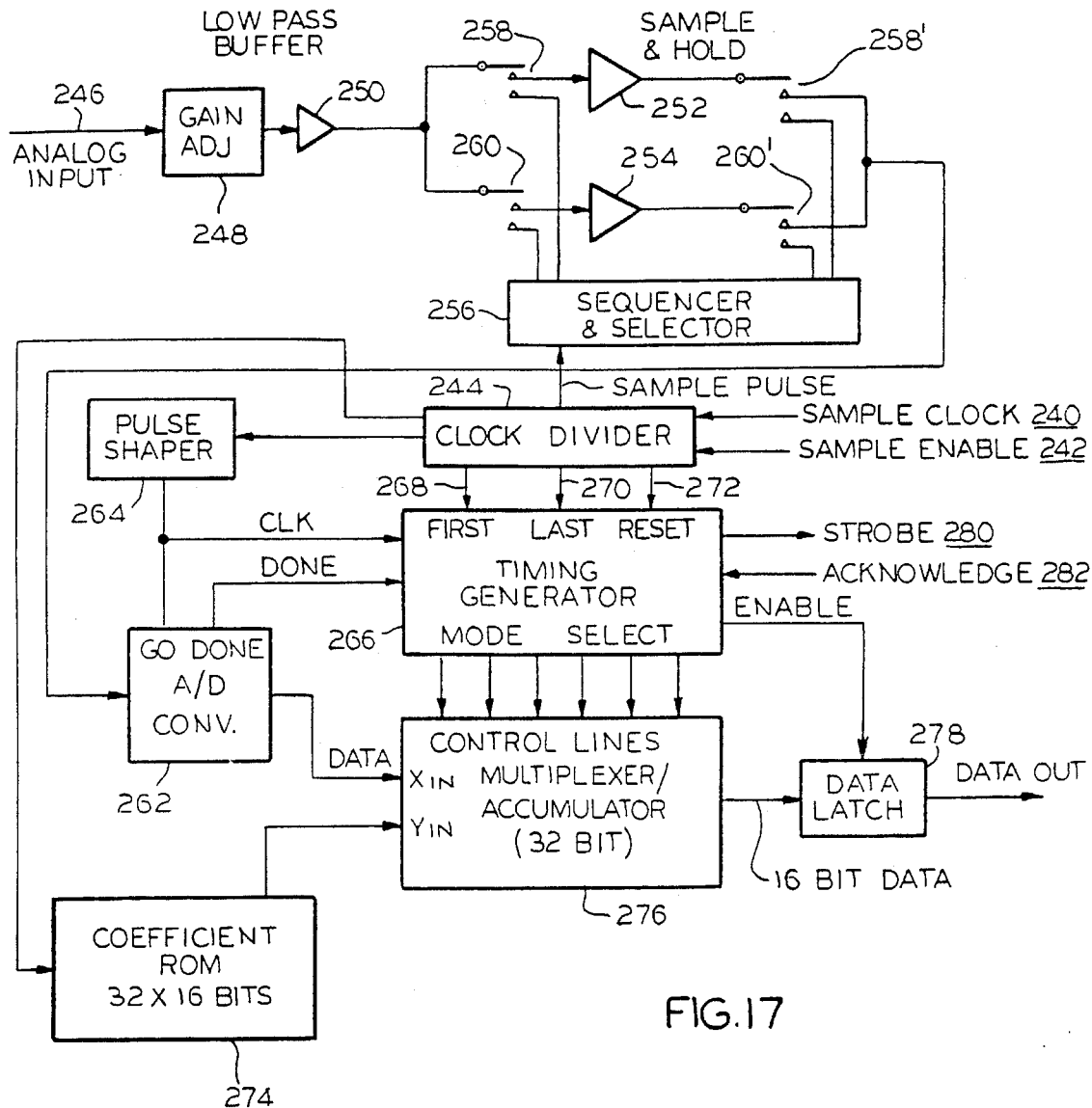
Figure 16:
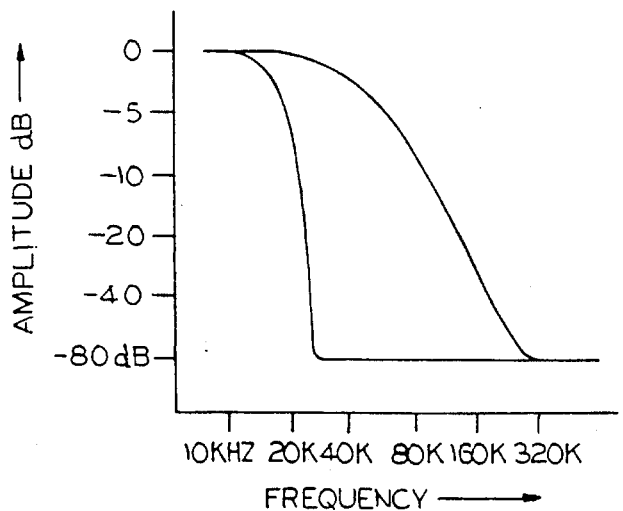
Figure 18:
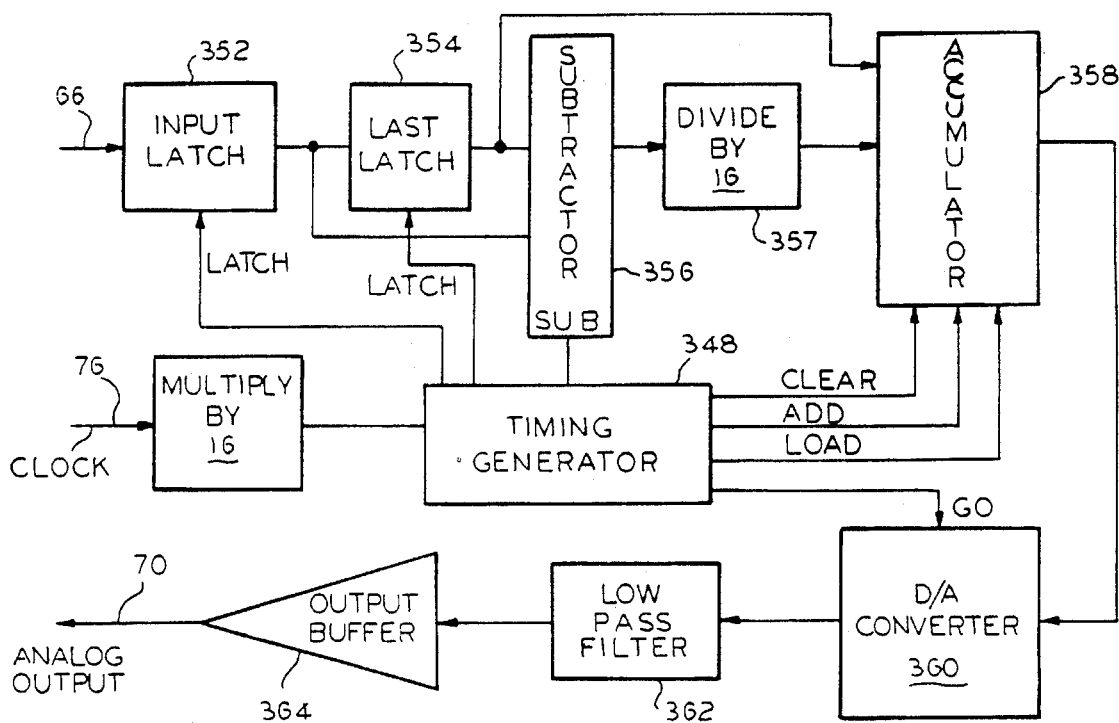
Figure 19:
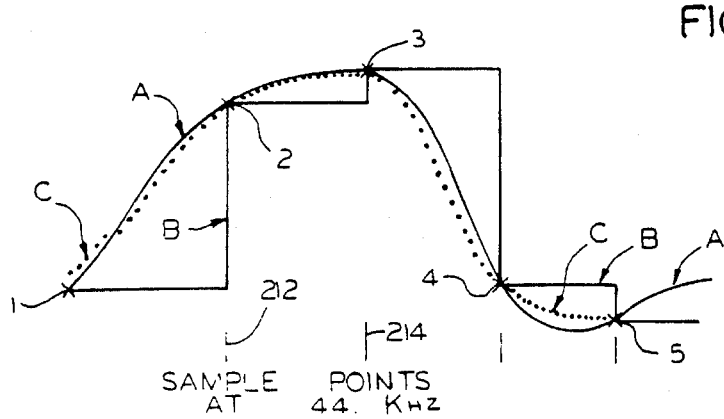
Figure 20:
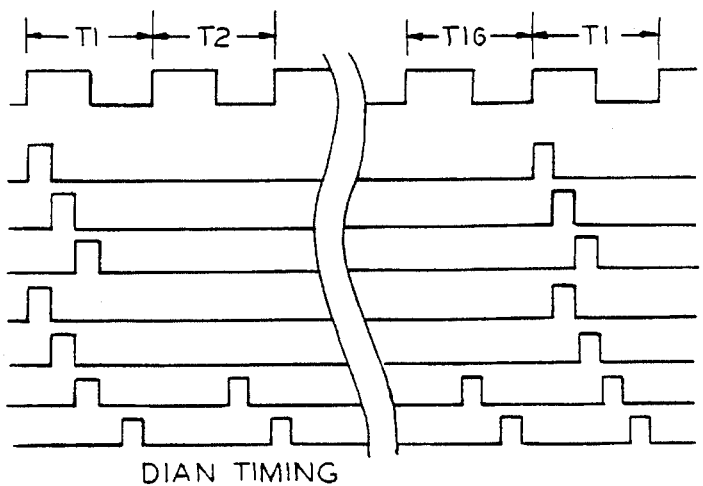
Figure 21:
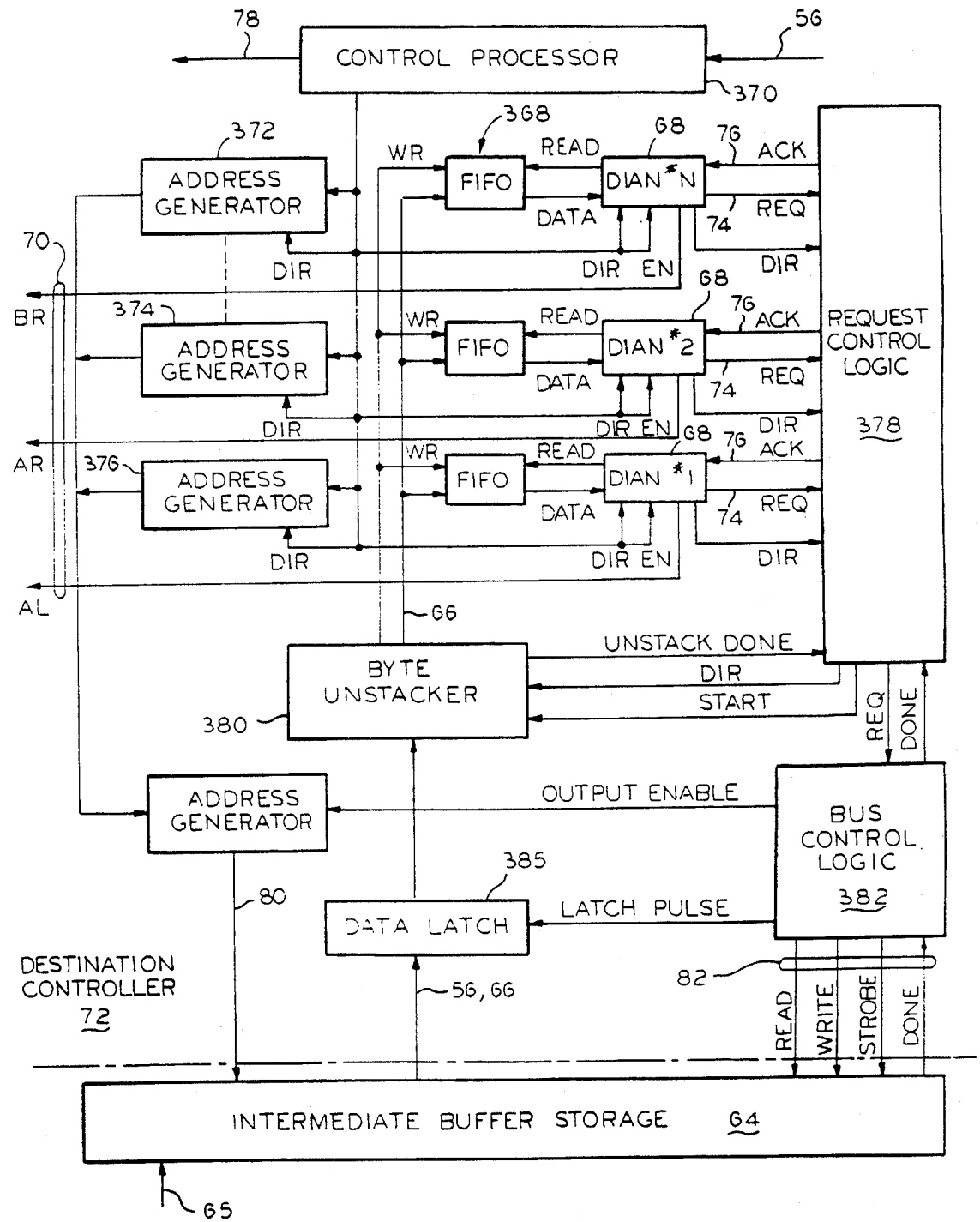
Figure 22:
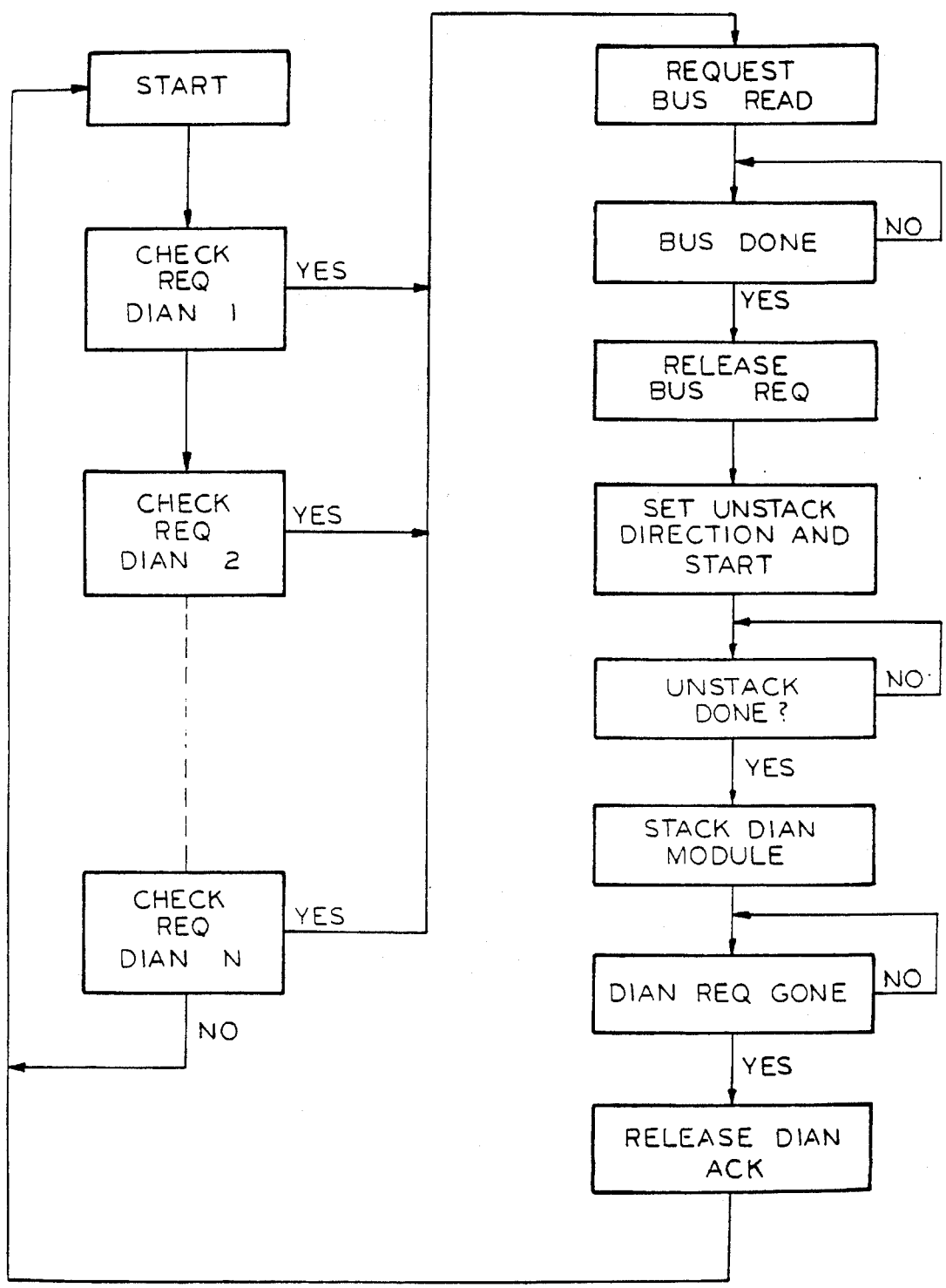
Figure 23:
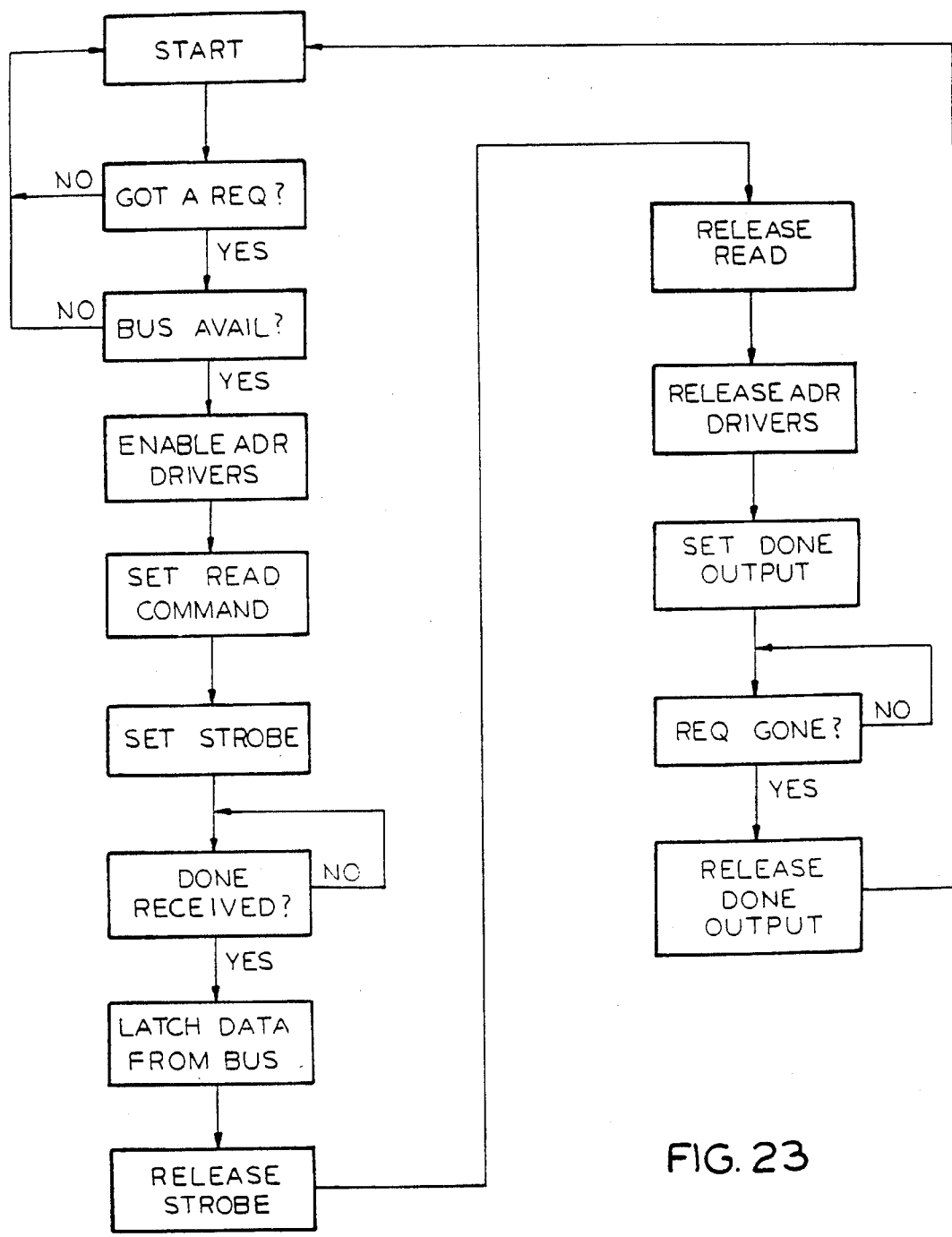
Figure 24:
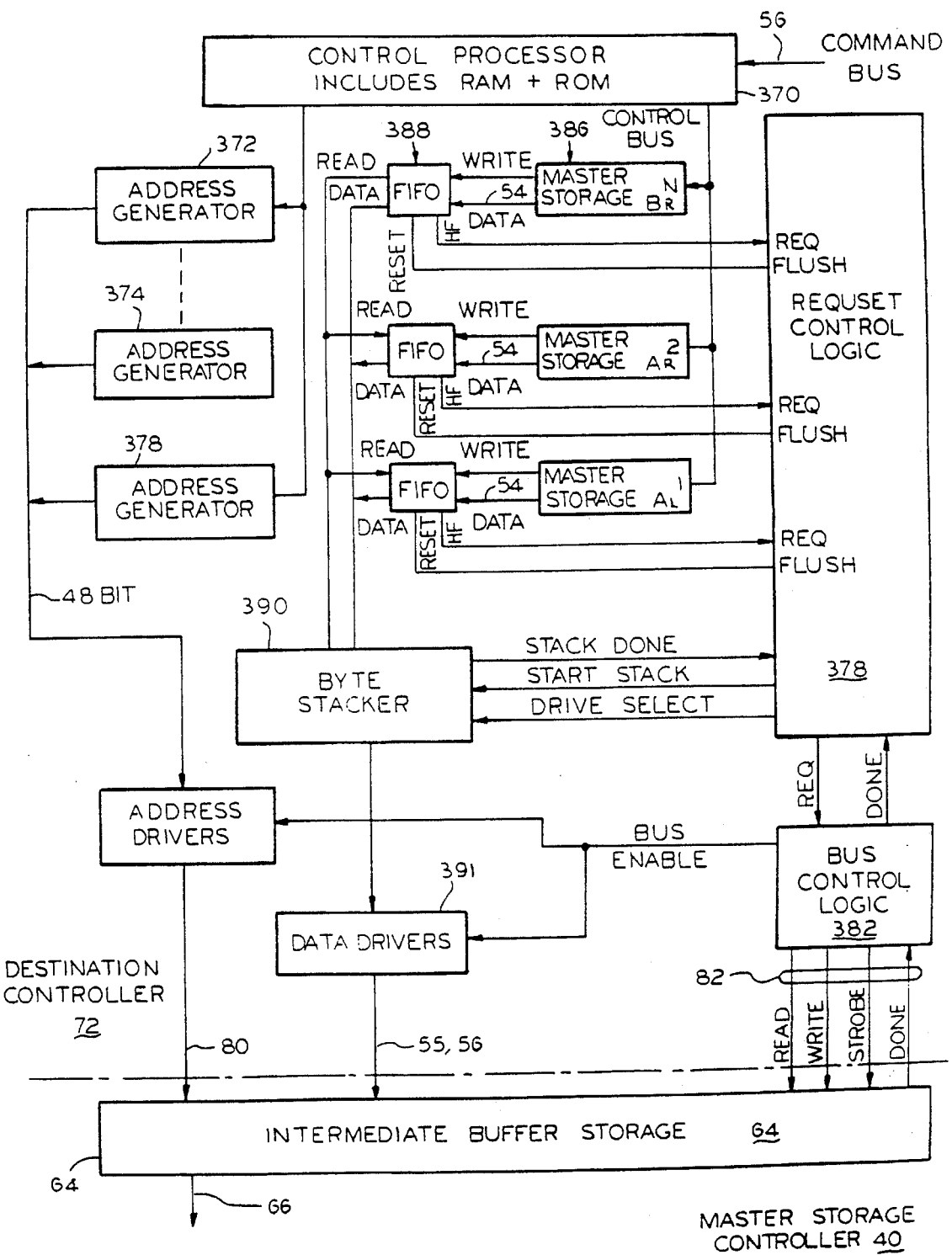
Figure 25:
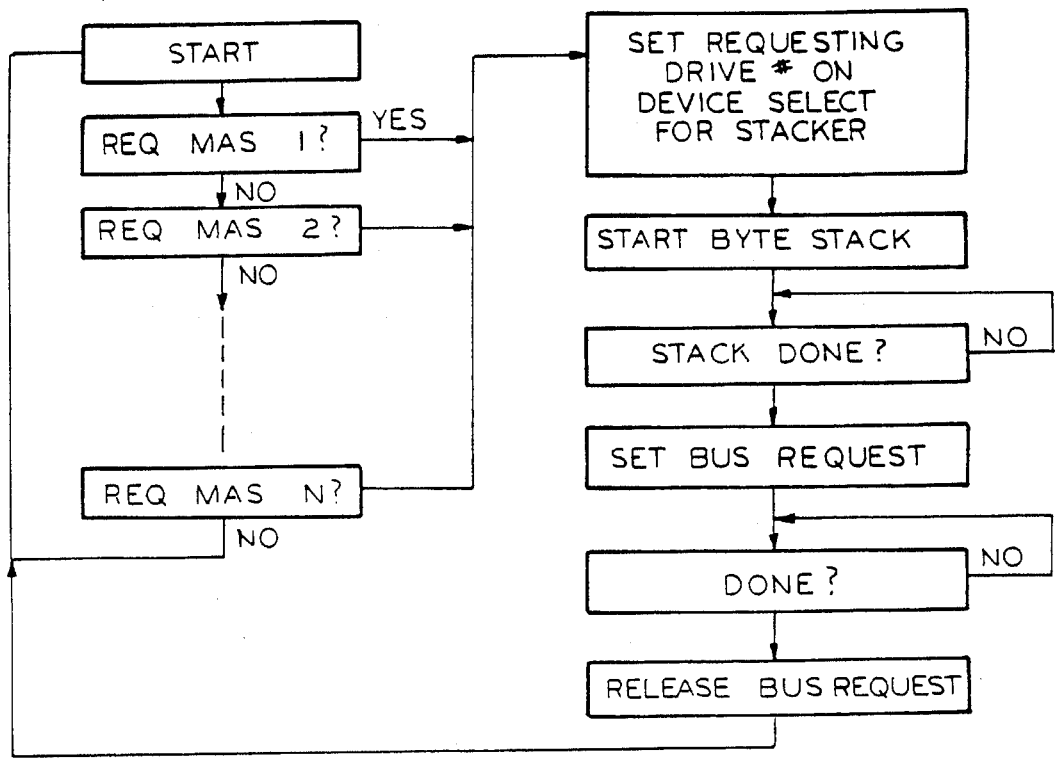
Figure 26:
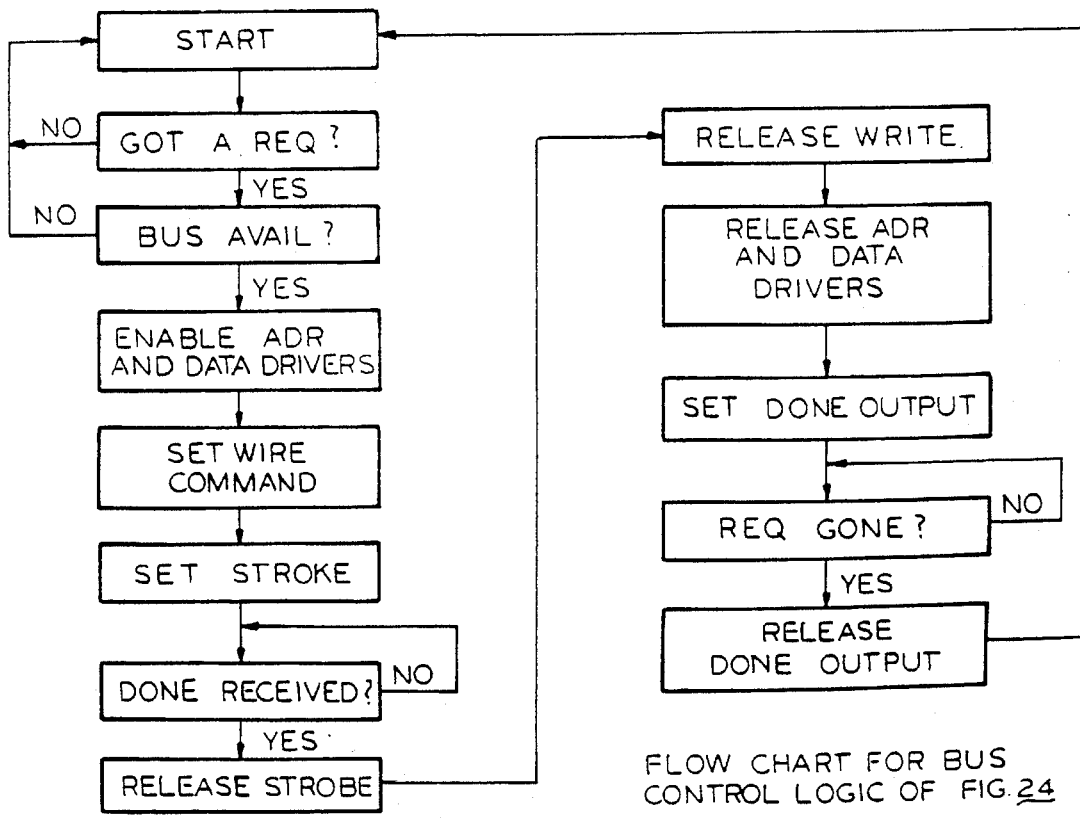
Figure 27:
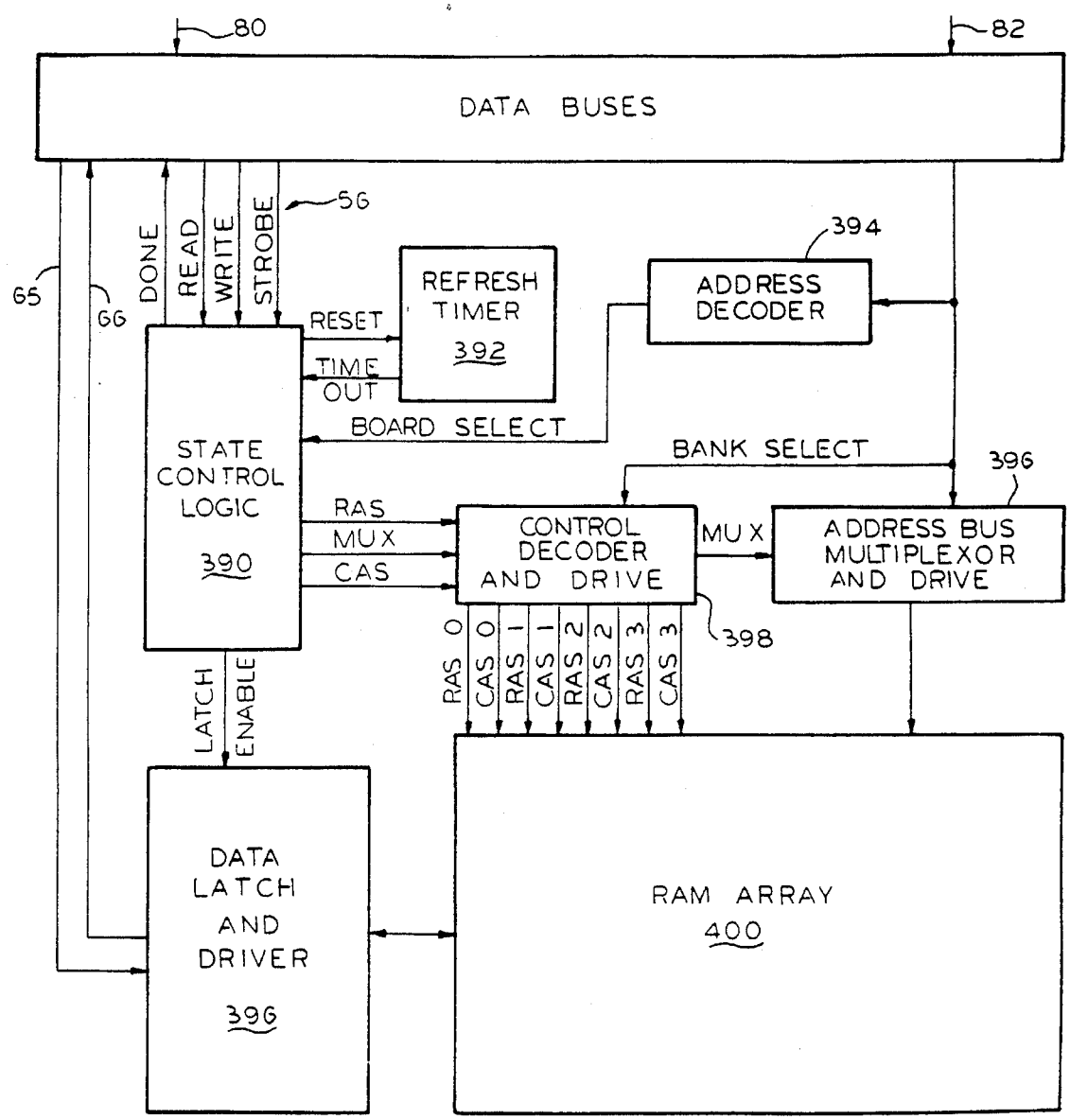
Figure 28:
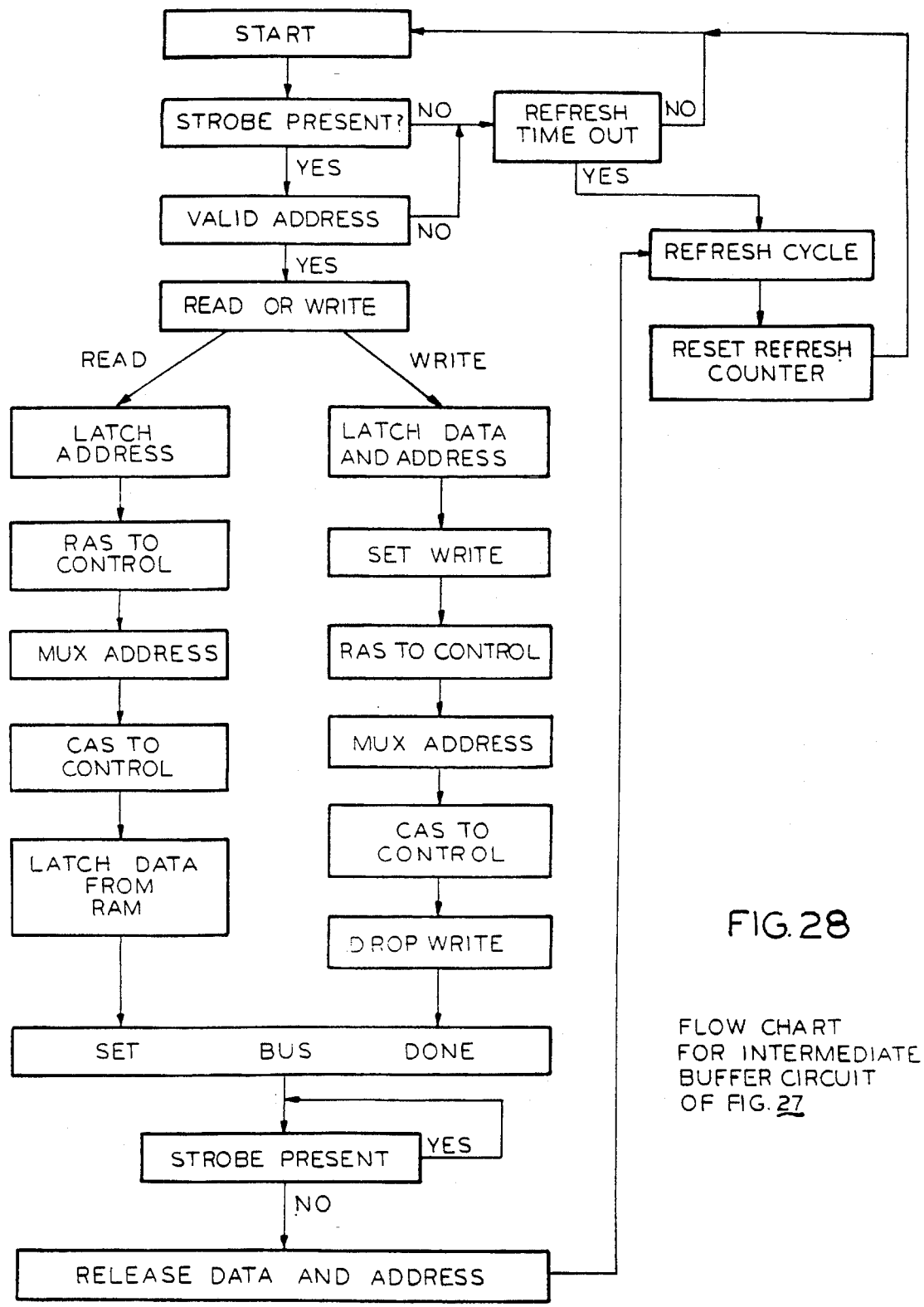

FIG. 3b indicates a clock rate caused roll off in the upper frequency range of signals passing through said low pass filter;

FIG. 4 is a timing chart for the operation of the analog-to-digital converter of FIG. 3;

FIG. 5 is a block diagram of a command control computer for use in the circuit of FIG. 1;

FIG. 6 is a block diagram of a master storage circuit for use in FIG. 1;

FIG. 7 is a block diagram of a master storage controller circuit used in FIG. 1;

FIG. 8 is a block diagram of a source media for use in FIG. 1;

FIG. 9 is a block diagram of a first embodiment of a digital-to-analog module for converting the digital data processed by the inventive system into an analog form for recording;

FIG. 10 is a timing diagram for the digital-to-analog converter of FIG. 5;

FIG. 11 is a destination controller for directing data taken from the master library to the album sized recording medium;

FIG. 12 is a block diagram of an intermediate storage circuit for buffer storing digital data relating to recorded information items which are read out of the master library and prior to its recording on the customized album;

FIG. 13 is a block diagram for a destination medium on which the custom album is recorded;

FIG. 14 is a graph illustrating, by best case and worst case examples, a loss of fidelity in a conventional prior art PCM recording;

FIG. 15 is a similar graph showing how a second embodiment of the invention improves the fidelity of the PCM signal;

FIG. 16 shows the high frequency end of a recorded characteristic curve that illustrates how the second embodiment of the invention improves the recorded fidelity;

FIG. 17 is a block diagram of a second embodiment of the analog-to-digital converter;

FIG. 18 is a block diagram of a second embodiment of a digit-to-analog converter;

FIG. 19 is a graph similar to FIG. 15 showing how the digital-to-analog circuit converts the digital signals back into an analog signal with improved fidelity;

FIG. 20 is a timing chart for the converter of FIG. 18;

FIG. 21 is a block diagram of a destination controller for use in the information retrieving system of FIG. 2;

FIG. 22 is a flow chart for the circuit of FIG. 21, showing the state of the circuit responsive to a request control logic;

FIG. 23 is a flow chart for the circuit of FIG. 21, showing the state of the circuit during bus control;

FIG. 24 is a block diagram of a master storage controller for use in connection with the information retrieving circuit of FIG. 21;

FIG. 25 is a flow chart showing the state of the circuit of FIG. 24 in a request for control condition;

FIG. 26 is a flow chart showing the state of the circuit of FIG. 24 during bus control;

FIG. 27 is a block diagram showing the intermediate buffer storage of FIG. 2; and FIG. 28 is a flow chart showing the control over the random access memory of FIG. 26.

FIG. 1 shows a system which may be used to store or create a master library containing a repertoire of recorded information items, such as musical selections, for example. The major parts of this system are a central controller 40 operating in response to a command control computer 42, a master storage medium 44, a source medium 46, and an analog to digital conversion module 48. The master storage medium 44 could be a laser disc, or the like. Any suitable source medium 46 may be used such as records, tapes, compact discs, optical tracks, or the like. Usually the pertinent playback device at 46 has an analog output at 50 which ANDI module 48 converts into digital data. The digital data is then transferred over a data input bus 52 and through storage controller 40 to the master storage medium, via a data bus 54. The storage of each recorded information item or selection is at its own individually identified address location in the master storage medium 44. All of this happens in response to control signals transmitted from a microprocessor or mini-computer 42 over control busses 56–60.

In FIG. 2, the selections stored in the master storage medium 44 are retrieved for assembly as an album which is recorded on any suitable destination medium 62, such as on a tape cassette, for example, or the like. In greater detail, the digital data taken from the master storage medium 44 are sent over data bus 54, through the master storage controller 40, and bus 65 to an intermediate buffer storage circuit 64. After an album amount of music (about forty-five minutes) is assembled in the intermediate storage circuit 64, it is sent over a data bus 66 to a digital-to-analog converter module ("DIAN") 68, from which an analog signal is sent via bus 70 and recorded onto medium 62.

The data retrieval circuit (FIG. 2) is controlled by a destination controller 72, which is driven from the microprocessor 42 via data bus 56 and master storage controller 40. Connected to the input/output ports of the destination controller 72 are data request 74 bus, digital-to-analog control commands bus 76, destination medium control bus 78, storage/retrieval address bus 80, and intermediate buffer storage control bus 82.

In operation, an operator simply applies any suitable recorded information in the source medium 46 (FIG. 1) by playing a recording, tape, or the like. For example, the operator may place a phonograph record on a turn table and play it back. The command control computer 42 assigns suitable addresses to each recorded information item that is played back and stored at 44. This address assignment may be done either automatically or in response to operator entered command signals. Any suitable printer 83 may print out a master list of recorded items and their addresses in the master storage 44. An automatic address assignment and print out is all done in approximately the same manner that a word processor assigns document numbers and prints out documents.

When a customer provides a list of items for inclusion in a single album, an operator consults the master list and enters the indicated addresses on a keyboard 85 (FIG. 2) associated with the command control computer 42. Responsive thereto, the master storage controller 40 reads stored data out of the library or libraries at master storage 44, where the digital data is that stored under each selected address. That read out data is then stored in the intermediate buffer storage circuit 64, at an address selected by the destination controller 72. After all of the digital data required to record an entire album is read from the master storage circuit 44, the destination control 72, acting responsive to computer 42, causes the intermediate buffer storage circuit 64 to transmits the entire album of data through the digital to analog "DIAN" module 68 for storage on medium 62, such storage being in an analog form.

In an alternative system, the intermediate buffer storage memory 64 (FIG. 2) may have a much smaller capacity. Then, the system may operate on a demand and fetch basis. That is, the master storage circuit 44 reads out a burst of data which is put into intermediate buffer storage at 64. In this alternative system, the resulting stored data immediately begins to be read out of buffer 64 for storage at the destination medium 62. As the data is being so read out, the intermediate buffer storage 64 makes repeated demands for more data from the master storage 44. As each demand is made, more data is fetched from the master storage circuit 44, which is used to replenish the data being taken from the intermediate buffer storage and recorded in the destination medium.

FIGS. 3, 4 show the details of a first embodiment of the "ANDI" analog to digital module 48 and of the timing of the module operation. This module 48 converts the analog information, taken from the source medium 46 (FIG. 1) into the digital data information that is processed and stored on the master storage device 44.

More particularly, the analog signal which is taken from a record or tape, for example, enters the module 48 through input port 84 and the input amplifier 86, which sets a uniform input signal level by providing a suitable gain. Also amplifier 86 isolates the input port 84 from the next stage 88 which is a low pass filter that rolls off or drops out the high frequencies.

The next stage is the sample and hold amplifier 90, which holds a sample of the input signal at a constant level while the analog-to-digital converter 94 is making its conversion. At 92, a mode input control signal is applied to the sample and hold amplifier 90 to select between the sample mode and the hold mode. In the sample mode, amplifier 90 reads the input signal and stores it inside the amplifier 90. In the hold mode, it holds the previously sampled voltage at a constant level, to prevent the analog-to-digital converter 94 from trying to convert an input signal with a level that is changing. In this particular system, the sample and hold amplifier 90 has a very high output impedance. The analog-to-digital converter 94 has a very low input impedance. Therefore, to compensate for this, a buffer stage 96 is coupled between these two devices. Of course, the buffer may not be required if the impedances match.

The signal which reaches the analog-to-digital converter 94 is converted into digital data, such as a 16-bit digital word, for example. When the analog-to-digital converter 94 completes the conversion, it strobes the digital word into a first-in first-out ("FIFO") buffer memory 98. This buffer stores the samples in aligned rows, which may be 1,024 samples long, for example. Then, on a first-in first-out basis, the command control computer 42 (FIGS. 1, 2) retrieves the stored data, on a word by word basis. The read-out data is transmitted through the digital buffer 100 to the master storage controller 40. This buffer storage enables the two systems to operate at speeds that are not synchronized.

The bandwidth is selected at 99 by sample and filter clock divisor signals sent over data bus 56 and received in the ANDI module 48. In greater detail, two of the more important circuits shown in this block diagram of FIG. 3 are the timing generator 101 and the clock divider unit 102. The timing generator 101 places the sample and hold amplifier 90 in a particular mode and starts the analog-to-digital converter 94. The timing generator 101 and the clock divider unit 102 are controlled via bus 56, by a signal which is sent under the control of the master microprocessor or minicomputer 42. In this particular embodiment, the source clock 104 is a 5.64480 MHz crystal oscillator which has an output that is an exact multiple of the industry standard sampling rate. Other frequencies may be used in other systems. Thus, the divider 102 provides a divided sample rate which is equivalent to or any multiple of the industry standard rate. The timing generator 101, in effect, retimes the clock pulses divided by circuit 102 in order to accommodate circuit delays, such as the finite time required for a signal to transfer from the input of amplifier 86 to the input of sample and hold circuit 90, for example.

The divided sample clock rate pulse stream is sent from clock divider unit 102 over wire 103 to drive the low pass filter 88.

In operation, clock controlled low pass filter 88 (FIG. 3*a*) switches a capacitor back and forth between its input and an output. Its effect is to start a process whereby the analog signal is divided into a plurality of pulses representing the intelligence in the analog signal. In greater detail, the low pass filter 88 includes a switched capacitor network 105 driven from clock pulses on wire 103, via divider circuit 106, and clock generator 107. The divider circuit 106 may be set to divide by 1, 2, or 4. The switching circuit 105 alternately connects a small capacitor to the input terminal "IN" and the output terminal "OUT". FIG. 3*b* shows a roll off characteristic wherein the frequencies passing through the low pass filter circuit fall off sharply after some frequency which is set by a ratio between the frequency of the input signal divided by the frequency of clock pulses delivered from the clock 107. Therefore, the roll off frequency may be changed by changing the dividing factor of the divider 106. This filter may be low pass filter LTC 1062 made by Linear Technology Corporation of Milpitas, Calif. 95035–7487.

Before the analog-to-digital conversion in converter 94, a small segment of the analog signal is fed to a sample and hold capacitor in circuit 90 where it is held long enough to accumulate a charge that represents the instantaneous amplitude of a generally analog wave shape during that segment.

The timing requirements for the embodiment of the analog to digital module that is shown in FIG. 3 can be seen in the timing diagrams of FIG. 4, which are thought to be self explanatory.

The command control computer module 42 (FIG. 5) includes a commercially available computer system 110 which should have multi-user capability. That is, the computer should be able to sort and segregate data into a number of different categories. Each of many clients and copyright owners has a separate record keeping memory to make royalty accounting possible. Thus, as each recorded information item is read out of the master storage, a record company or other person owning the copyright on that particular selection receives an accounting credit. In one system, the command control computer was a four-user Maxicom/DL computer with an 85-megabyte, hard disk drive. This unit has a general purpose parallel interface card 112 which sends commands and receives responses from commands over the various data buses. Any suitable interface circuit 112 may be provided to integrate this computer into the over all system. In general, these interface circuits meet the SCSI (small computer system interface) standards.

The master storage circuit 44 (FIG. 6) includes any suitable recording device, such as a commercially available twelve or fourteen inch laser read-write device 114 with a removable disc. One system used an Alcatel Thomson Gigadisc. Data is stored on and retrieved from the disc by the master storage circuit 44 in response to standard industry commands. Both the data and the master storage commands are sent over the data bus 54.

The master storage controller 40 (FIG. 7), uses custom software with a commercially available 32-bit central processor unit 116 which may be a Motorola MVME-130, for example. An SCSI interface card 118, and a general purpose parallel interface card 120, interconnect the controller 40 with other circuits via standard data buses.

The source medium 46 (FIG. 8) is any suitable commercially available, studio quality, reel-to-reel player, phonograph disk player, cassette player, CD disk player, or any other suitable device 126 that can supply suitable audio output signals, usually analog signals. Once the source medium 46 has received its command, regardless of whether it is "start", "stop", "rewind" etc. . . . , over the source medium control bus 58, it responds as directed and sends analog output signals over the source medium output bus 50 to the next stage.

Under the control of the command control computer 42, the storage controller 40 selects the bandwidth. Then, controller 40 starts the source medium 46 by sending signals over the source medium control bus 58. Once the master storage controller 40 has started the source medium 46, it begins receiving samples which are sent from the ANDI module 48 over the input data bus 52. These samples are forwarded through the bus 52 to the master storage circuit 44 by way of the data bus 54.

After the command control computer 42 commands a read-out, controller 40 sets up the destination controller 72 (FIG. 2) by way of the command bus 56. After the destination controller is initialized, it begins a retrieve cycle in order to take data from master storage circuit 44 by way of the master storage data bus 54 and the SCSI interface card 118 (FIG. 7). The information that is being received from master storage circuit 64 is sent over the data bus 54 to the intermediate buffer storage circuit 64, where it is stored.

FIGS. 9, 10 show details of a first embodiment of the digital-to-analog (DIAN) module 68 and of the timing of the module operations. This module 68 translates the digital data as it is received from the destination controller circuit 72 (FIG. 2) into the analog information that is required for the destination medium 62.

The digital-to-analog conversion process starts with the destination controller circuit 72 setting a clock divider unit 130 in the module of FIG. 9 to operate at the desired output sample rate. The command signals that set the sample rate are sent via the command control bus 76. After a period which is long enough for this clock rate to stabilize, the destination controller 72 (FIG. 2) starts the destination medium via bus 78. The intermediate buffer storage circuit 64 continuously sends 16-bit samples to the first-in first-out buffer circuit 132 (FIG. 9), over the data bus 66.

Two critical circuits in the digital-to-analog module (FIG. 9) are the timing generator 134 and the clock divider unit 130. The timing generator retimes the divided clock pulses in order to accommodate the circuit delays. For example, there is a circuit delay that is required for a signal to transfer from the FIFO buffer 132 to the converter 142, which the retimed pulse accommodates.

The master clock 136 has a frequency of 5.64480 MHz in this embodiment. This frequency is divided by the clock divider unit 130. The destination controller 72 sends a divisor control signal to the clock divider unit 130 which is used to divide the master clock pulse repetition rate. Likewise, the destination controller also sends a divisor control signal over the command control bus 76 and through circuit 130 to the low pass filter 140, which uses it as a filter clock frequency. The output of the low pass filter 140 goes through an output buffer 146 in order to drive the destination medium 62 via bus 70.

As the sample clock pulse stream is sent to the timing generator 134, it generates and sends a read pulse to the first-in first-out buffer 132. Once this read pulse has been sent, the data is read out of the first-in first-out buffer 132 to the digital-to-analog converter 142. Converter 142 then receives a start command from the timing generator 134, via wire 143, whereupon it ignores all other data on its inputs and converts the digital data word that it receives into an analog output sample. The analog output signal travels through a buffer stage 144 to low pass filter 140, which limits the output frequency response of the system. Because the output sample frequency may be changed for varying destination speeds, the low pass filter 140 may be programmed to vary the roll off frequencies, without requiring a revision of the software.

FIG. 10 shows the timing for the operation of digital to analog converter of FIG. 9. It is thought that this chart is self explanatory.

The details of one embodiment of the destination controller 72 are shown in FIG. 11 as including two 32-bit binary counters 150, 152 and a destination control latch 154. The destination control process begins with the master storage controller 40 (FIG. 2) storing, via the command bus 56, a start address in the 32-bit binary counter 150. Destination controller 72 triggers the digital-to-analog circuit 68 via the bus 76 (FIG. 9). Then, data bytes begin flowing from the master storage circuit 44 (FIG. 2) through the master storage controller 40 to intermediate buffer storage circuit 64.

The intermediate buffer storage circuit 64 (FIG. 12) has a module with a memory which consists of a large RAM array 156 and a storage capacity of ninety-six or more megabytes. Data comes in from the master storage controller 40 (FIG. 2) via the data bus 65 (FIG. 12) and is combined in circuit 158 with a 32-bit storage address received from the destination controlled 72 by way of the storage address bus 80. This combined data is then stored in RAM 156 at the indicated address. Data is retrieved from the RAM 156 in response to an address that is generated in the destination controller 72 and sent over the retrieve address bus 82. Once the address has been latched at circuit 160, data is retrieved from the RAM array 156 and is sent to the DIAN module 68 via the data bus 66.

Each time that the intermediate buffer storage circuit 64 receives a data byte, it also sends a strobe signal over part of the data bus 56 to the destination controller 72 (FIG. 2). This strobe signal increments the counter 158 each time that a data byte is stored into intermediate buffer storage circuit 64. At this time, the new address is incremented and sent back from the destination controller 72 to intermediate buffer storage circuit 64 via the address bus 80. This process continues until the master storage controller 40 has sent all of its data bytes to the intermediate buffer storage, at which time it sends a sample rate divisor to the digital-to-analog module 68 (FIG. 2) via the command bus 56.

Once the sample rate has settled in the module 68 (FIG. 9), destination controller 72 sends a destination medium control start signal over the destination medium control bus 78 (FIG. 11). Assuming that the destination medium is a cassette recorder, it is started in a record mode by this signal. Then, the destination controller circuit 72 sets up the intermediate buffer storage circuit 64 (FIG. 12), starting a retrieve address routine via the command bus 82 and then enables the digital-to-analog module 68. As they are needed, the module 68 sends a data bytes request signal over the data request bus 74 to the intermediate buffer storage circuit 64. Also, destination controller 72 (FIG. 11) increments the retrieve address binary counter 152, which then sends the newly incremented address to the intermediate buffer storage circuit 64 via the retrieve address bus 80. This process continues until all data have been sent from intermediate buffer storage circuit 64, at which time the master storage controller 40 (FIG. 1) stops the digital-to-analog module sample rates, and also stops the destination medium 62 (FIGS. 2), via the destination medium control bus 78. The tape recorder or other recording device switches off.

When the recording is completed by the destination medium 62, the master storage controller 40 may send a "rewind" or other suitable command via the destination medium control bus 60 to end the recording production.

The destination medium 62 (FIG. 2) may include any commercially available duplicator, and usually any suitable cassette recorder, such as those sold under the trademarks Infonix, Pentagon, etc. . . . The destination medium 62 receives its command (regardless of whether they are "start", "stop", "rewind" etc. . . . ) over the destination medium control bus 78. Once it has received its command, the destination medium 62 then records the audio signals which it receives over the destination medium signal bus 70.

FIG. 14 is a graph which illustrates a problem that the prior art encountered when music is reduced to a pulse code modulation ("PCM") signal. This graph plots time along a horizontal axis and amplitude of sound along a vertical axis. A musical signal is shown which is much more complex than a similar voice signal. This complexity occurs because there is an accumulation of musical instruments (trumpets, violins, drums, bells, etc.) which together make a much greater variety of sounds than a human voice can make.

The PCM technique originated in telephony where the highest frequency level of the transmitted voice signal is about 3500 cps. The work which was done for telephony indicates that the sample rate should be at least twice the highest frequency that is to be encoded (i.e. sample at a frequency which is at least around 7000 cps).

There are two problems when this standard PCM sample rate (i.e. sample at twice the highest frequency) is applied to music. First, a sine wave suitably approximates a voice signal as it is transmitted over a telephone line, since the wave form of the lower frequencies of a single human voice does not depart too far from such a sine wave. However, a sine wave does not provide an adequate basis for a study of musical signals, filled with the complex sounds of an orchestra, for example. Second, telephony is interested in a low cost transmission of a signal, with only a sufficient fidelity for (1) an easy understanding of the spoken word and (2) a not too offensive overall sound. In music, a mere understanding is not enough. There is a demand for complete fidelity, at a quality standard which is much higher than the quality which is required for simple speech.

To illustrate this point, FIG. 14 contains an analog wave form 200 of music which has been arbitrarily drawn to show that a simple sine wave can not represent more than a bare minimum of the available intelligence. Thus, telephony studies based on sine waves are not adequate to teach how to encode musical signals. Accordingly, the standard sampling rate at twice the highest frequency is not adequate for music.

In FIG. 14, the marks 212,214 indicate the boundaries of a single one of many cyclically recurring time slots which have the conventional relationship wherein sampling must be carried out at twice the highest frequency that is to be reproduced. The instantaneous amplitudes of the sample line 216 indicate a rough approximation between the analog wave 200 and the sample wave form 216 within the time slot 212, 214. The approximation occurs because the volt/second content of the time slot pulses forming lines 216, 228 generally coincide with the averages of the analog wave form. However, even a glance also reveals that there is much intelligence in analog curve 200 which is completely lost in the sample curve 216.

Next, suppose that the analog wave form 200 is displaced slightly relative to the time slot 212, 214 so that the sample period coincides with peak values 220, 222 in the analog wave 200, instead of with some fairly randomly positioned mid-points 224, 226 on the analog wave 200. Now the sample wave form 228 results. A visual comparison of sample wave forms 216, 228 quickly establishes that the sample wave 228 is a very poor representation of the analog curve 200. For present purposes, wave 216 may be called the "best" case and wave form 228 may be called the "worst" case.

The differences between (i.e. the spaces between) the analog waveform 200 and the sample waveforms 216, 228 is known as the "sample error." The assumption has to be that the time slots and an analog average will not always coincide with a resulting worst case sampling error (i.e. that the error will be that of sample wave form 228 and not of sample wave form 216). Therefore, audio systems should be designed to provide the best possible results with the worst case wave form 228.

A little thought makes it clear that the sample error increases with an increase in the frequency of sound represented by the analog signal. Accordingly, the sample error may be reduced by passing the analog wave 200 through a low pass filter. Or stated another way, if a filter eliminates the peaks 220, 222, 223 the worst case sample wave form 228 becomes very close to the optimum sample wave form 216. However, the analog wave form which is being reproduced has already lost much of its character by the low pass filtering. This low frequency filtering of the analog wave form 200 completely destroys the intelligence represented by the peaks 220, 222,223. That loss presents a new set of problems for an audio reproduction system which is trying to provide a higher fidelity. Among these problems is a restriction of bandwidth for the recorded signal.

It is apparent that if the samples are taken more often (i.e. if the sample rate of the time slot 212, 214 recurs at a higher frequency), the sample will follow the analog signal more closely. However, it is very difficult for the engineer designing a recorder to make a fairly arbitrary decision to increase the sample rate since the industry standard time slot repetition rate is now well established. If a recording/reproducing system is designed to operate at a new and different higher sampling rate, existing reproducing equipment can not play back the recordings made at that new standard.

According to the second embodiment of this invention, a sampling system is run at a very high rate in order to track the analog signal more closely and with greater fidelity than is possible under the industry standard. The results of this high speed sampling are fed into a computer which calculates a theoretical wave form, as it would appear at the standard sampling rate, if it follows and approximates the original analog signal with the best cases wave form. Then, the PCM signals which are sent to the recorder are based on the theoretical sampling wave form which is calculated and not on the samples which are actually read off the analog signal.

In greater detail, FIG. 15 shows the analog wave form 200 and sampling time slot 212, 214, which are the same as the correspondingly numbered analog wave form and time slot shown in FIG. 14. Thus, a sampling wave which conforms to this time slot 212, 214 has all of the characteristics of a standard sampling wave which may be encoded and later played back on conventionally available reproducing equipment. On the other hand, in this embodiment, the sampling circuit is driven at a very high rate (such as sixteen times the standard sampling rate). As a result, the analog signal is sampled fast enough to follow it very closely; therefore, the analog signal is represented much more faithfully. The high rate sampling periods are represented by "X" marks (one of which is 230), each sample having an amplitude which fall on the analog signal.

From these high speed samples, a computer calculates the volt/second content of pulses forming the sample wave form 232 or 234 which most closely represents the analog wave 200. The best case sample wave form 232 in FIG. 15 is drawn to be substantially the same as the best case wave form 216 in FIG. 14; since it is the best case, it does change with the invention. However, the worst case wave form 234 for the invention is shifted from the best case wave form 216 by the same amount that the prior art worst case wave form 228 is shifted from the best case wave form 216. By comparing the area between the two prior art sample wave forms 216, 228 with the area between the two inventive sample wave forms 232, 234, it is easily seen that, with the invention, the worst case sample wave form 234 is much closer to the best case sample wave form 232, than the worst case prior sample wave form 228 is displaced from the best case sample wave form 216. Accordingly, it is no longer a problem if the sampling tends to coincide with extreme peaks of the analog signal, in the manner that the sampling wave 228 coincides with the extremes of the peaks and valleys of the analog signal 200.

FIG. 16 is a graph which indicates the improved fidelity high frequency end of the spectrum for the inventive recording system, as compared with a prior art recording system, using the standard sampling rate. The frequency delivered by a recording will rise at some low frequency, have a flat top, and fall off at some high frequency. FIG. 16 shows that, for the standard system, the fall off is abrupt at about 20K. With the inventive system, there is about a 2 dB loss at 40K, and a 5 dB loss at about 60K. While people can not actually hear at these high frequencies, there is a psychological response thereto which greatly enhances the recorded sounds, especially in the "noise" range. (i.e. such things as drums, bells, etc.).

FIG. 17 shows a block diagram of a circuit for practicing this embodiment of the invention. In greater detail, a sample clock input 240 receives clock pulses at a suitable high frequency repetition rate which enables a closer tracking of the analog signal, as indicated by the X-marks 230 in FIG. 15. It is thought that a sample rate which is sixteen times the normal clock rate might be in order. When the sample enable lead 242 is energized the clock divider circuit 244 responds to the clock pulses and provides several output signals.

The analog signal appears at input terminal 246 and is applied to a gain adjustment circuit 248 which brings all input signals to a standard amplitude. Thereafter, the signals pass through a buffer amplifier 250 which provides isolation. Two sample and hold circuits 252, 254 are provided to operate alternately since the inventive sample speed is too high for response by components in a single sample and hold circuit having an acceptable level of precision of response. The sample and hold circuits 252, 254 are alternately enabled under the control of a sequence and selector circuit driven from the clock divider circuit 244. The circuits for actually selecting these sample and hold circuits is represented by the switches 258, 260, 258', 260'. The outputs of these sample and hold circuits 252, 254 are applied to the input of an analog-to-digital converter 262.

The clock divider circuit 244 applies clock pulses to sequence and selector circuit 256 and to the converter 262 at the high repetition rate of the sample clock 240. The pulses are reshaped by pulse shaper 264. The high sample rate may be sixteen times the standard sample rate.

The clock divider pulses a timing generator 266 to inform it of the time conversion, and it groups the high speed samples at the standard rate. For example, at the suggested sixteen-to-one time conversion, clock divider 244 pulses the "first" terminal 268 on the first of each of sixteen sequential clock pulses and pulses the "last" terminal 270 on the sixteenth pulse, immediately followed by a reset pulse 272 on the "reset" terminal. Thus, circuit 266 groups sixteen high speed samples into one standard sample.

The analog-to-digital converter 262 converts each sample pulse in response to a clock pulse transmitted through pulse shaper 264 to the "Go" terminal. After each of the sixteen samples in a group, the converter 262 sends a "done" signal to the timing generator 266.

The clock divider 244 sends a four bit number to the ROM 274 for each of the sixteen samples applied to and encoded by converter 262, to identify each of the sixteen high speed samples in a group as it is then being received. This number causes the ROM 274 to send a coefficient to an accumulator 276, where it is used as a multiplier. The coefficients in the ROM are put there by a programmer who designs the ROM. For example, if all sixteen pulses have the same weight, the multiplier is 1/16 for each high speed sample pulse. On the other hand, if the circuit 276 takes a trend into account, there may be different coefficients for each high speed sample in the group. Thus, if the sample shows that the sixteen high speed sample pulses form an envelope which more or less follows a triangular analog curve, the coefficients represent the area of a triangle. Another coefficient is used to produce the area of a rectangle if the high speed samples have an envelope which is a rectangular curve within the sample area represented by the group of sixteen high speed samples.

The analog-to-digital converter circuit 262 sends each of the digitally encoded pulses which represent the analog signal to the accumulator 276. There, they are multiplied by the coefficient derived from the ROM 274 and then accumulated to bring the sample signals into correspondence with the industry standard sampling rate.

In greater detail, FIG. 15 has been drawn to show sixteen X-marks 230 on the analog curve 200, within the standard sample period 212, 214. The converter 262, (FIG. 17) converts each of the high speed samples represented by these X-marks into a pulse code, which is sent to accumulator 276. The accumulator stores the codes of the sixteen samples forming a group corresponding to a standard time slot and computes the pulse code of a hypothetical sample that best represents the analog curve during the standard time slot 212, 214.

The data latch circuit 278 is enabled periodically to gate out the pulse code representing the hypothetical sample of the standard time slot. This code may be recorded directly; or, depending upon system needs, it may be transmitted to a FIFO memory for buffer storage to enable a retiming of the code pulses.

Each time that a hypothetical sample has been computed at the standard rate, the timing generator pulses a "strobe" lead 280 to inform associated equipment that a sample has been completed and is coming to be recorded. That associated equipment responds to the strobe by pulsing the acknowledge bus 282. The circuit is now ready to process the next sample.

The second embodiment of digital-to-analog module 68 is substantially the inverse of the circuit shown in FIG. 17. In this module, the coefficient ROM 274 may play a more important role since the sixteen high speed sample pulses may be given different amplitudes, thereby more closely approximating the true analog curve.

Details of the system for recovering the analog signal are given in FIGS. 18–28, which relate to the construction of the DIAN module 68 (FIG. 2), the destination controller 72, and the intermediate buffer storage circuit 64.

The DIAN (FIG. 18) is another embodiment of the DIAN module, which is shown in FIG. 9, and which may compute a more accurate analog curve. More particularly, the digital-to-analog converter circuit ("DIAN") of FIG. 18 is substantially the reverse of analog-to-digital circuit ("ANDI") of FIG. 3. Each of these DIAN converter circuits is also individually useful, aside from their use in the inventive system. For example, the ANDI circuit could be used as part of a recorder, and the DIAN could be used in a playback system. However, these circuits are described herein as being used together in a single system.

The oversampled output of the digital-to-analog module of FIG. 18 almost eliminates the need for an output low-pass filter, since the oversampled output does almost all of the filtration itself, as indicated in FIG. 3b. The DIAN action makes a very high speed operation possible without requiring a switched capacitor filter. Also, if it should become desirable to change the output speed, say from 16X to 32X, the DIAN action tends to eliminate a need for low pass filters.

In FIG. 19, line-A represents the original analog wave form which was the basis of the analog-to-digital conversion in FIG. 3. Therefore, ideally, this exact curve desired at the output of the DIAN module. Line-B represents a stepped output curve which a standard PCM converter would produce, based on the samples taken at points 1, 2, 3, 4, and 5 in line-A of FIG. 19. Line-C represents the computed analog output which is produced by the DIAN module of FIG. 18. Line-C is created by computing sixteen samples (each represented by a dot) which are at points that are evenly distributed along segments of a sine wave which are most likely to represent the changes between the successive points 1 and 5.

In greater detail, the DIAN (FIG. 18) receives the digital or stepped signal represented by line B; however, it is completely obvious that the analog signal did not have the stepped wave with square corners at 1, 2, 3, 4, 5. There was a relatively smooth curve extending between these successive points. As explained above, a simple sine wave does not approximate a continuous flow of an entire analog musical selection in the sense that it approximates a human voice for telephonic communications. However, it is much better than a square wave and for the brief time represented by points 1, 2; 2, 3; . . . 4, 5, it does approximate music. Thus, in the short distance between points 1, 2 of FIG. 19, segments of a sine wave are superior, as compared to the approximation of the square wave B.

Accordingly, the circuit in the inventive system looks at points 1, 2 on curve B and computes sixteen points (shown by dots on curve C) evenly spaced between the sampled points 1, 2. In an alternative embodiment, the computer calculates a segment of a sine wave which would most likely fit the change represented by points 1, 2. Next, the circuit looks at the change represented by points 2, 3, and computes sixteen points which are evenly spaced to this next point or which represent a segment of a sine wave which most approximates the change. In one embodiment the calculated analog wave is linear between the points 1, 2; 2, 3; etc. In the other embodiment, the segment of the sine wave which was computed for the change between points 1, 2, and the next computations for two segments of a sine wave curve most likely to have occurred between points 3, 4 and 4, 5 form the analog curve. Thus, in either embodiment and considering the differences between the two embodiments, the DIAN converter, in effect, draws a "most probable" curve which fits the leading corners of the successive square wave pulses stored in the intermediate buffer storage circuit 64.

By using this process, a wave form may be computed which is a more faithful duplication of the original analog wave form. Since the computed waveform is smoother than the conventional digital curve, it reduces the demands upon the low pass output filter, thus both improving the performance and reducing the complexity of the circuit.

The operation of the DIAN module of FIG. 18 is coordinated by clock signals which are multiplied by sixteen and applied through timing generator 348. This clocking system is similar to the clocking system that is shown at 244 in FIG. 17.

In greater detail, the sample data is received from the intermediate buffer storage circuit 64 (FIG. 2), via data bus 66 (FIG. 18), which is the same as bus 66 shown in FIG. 2. This sample data is latched in the input latch 352 (FIG. 18) on the first sample clock pulse that is received via wire 76 from the destination controller 72 (FIG. 2). Then, subtractor 356 subtracts the output signal of the last sample latch 354 from the present signal supplied by the input latch 352. The difference resulting from this subtraction is the delta modulation or the change in signal (points 1, 2 or 2, 3 . . . in FIG. 19), which is then latched on the output of the subtractor unit 356. This difference or change signal is divided by sixteen at 357 and applied to accumulator 358.

In the accumulator 358 (FIG. 18), the output of the subtractor 356 is added sixteen times to the last sample data. Each one of those sixteen newly computed samples is sent to the digital-to-analog converter 360 where it is converted into an analog information signal. This analog information signal is then sent through the lowpass filter 362 to the output buffer 364, which produces the output analog signal and forwards it over wire 76 to destination medium circuit 62 in FIG. 2. FIG. 20 is a self-explanatory series of time related pulses which show the timing of the circuit of FIG. 18.

The destination controller 72 (FIG. 21) is an alternative embodiment of the destination controller 72 of FIG. 2. The destination controller 72 (FIG. 21) uses a control processor 370 which may be a micro processor or a minicomputer that controls a plurality of DIAN modules 68, each of which may be in FIGS. 2 or 18. Each DIAN module has access through a first-in-first-out buffer memory 368 to a byte unstacker 380 which converts the bit transmission stream between serial and parallel streams in order to take data from memory and transmit it over a data bus. The control processor 370 also drives address generators 372–376 which increment to successively call up the data store in memory and to transmit it through the DIAN modules 68 to the outgoing signal buses.

Assuming that the inventive system is used to record a conventional audio cassette, there are A and B tracks, each with a left and a right channel to give stereo sound. If so, the DIAN #1 (FIG. 21) provides the left channel for the A track, as indicated on the left-hand edge of FIG. 21 by the notation "$A_L$". The DIAN #2 provides the right channel for the A track $A_R$. The DIAN #N provides the right channel for the B track, $B_R$. Another DIAN module (not shown) provides the left channel for the B track. All of these channels correspond to wire 70 in FIG. 2.

The input signals arrive at the intermediate buffer storage circuit 64 via wire 65. Thus, the signal path is traced from wire 65, through intermediate buffer storage circuit 64, data latch 385, byte unstacker 380, a FIFO memory, a DIAN module, and conductors 70.

In greater detail, a command to reproduce recorded information is received over command bus 56, which also appears in FIG. 2. This command is fed into the control processor 370 (FIG. 21), whereupon the control processor 370 sets the appropriate starting addresses for each of the address generators 372–376, associated with the DIAN modules 68. After the addresses are set, processor 370 selects the direction in which the address counts increment in the address generators and thus the directions in which the bytes are read out. This ability to provide a selected one of bidirectional read outs enables the system to playback the recorded information in both the forward and reverse directions. Thus, the recorded destination medium may be recorded in either a backward or a forward direction. Stated another way, the conventional audio tape cassette has tracks A and B which are played back while the tape moves in opposite directions. In this example, DIAN modules #1, 2 read out in a forward direction while DIAN module #N (and another not shown) read out in an opposite direction. By reading data from memory in bidirections, the invention records track A from start-to-finish and track B from finish to start. The consumer plays side A while the tape moves in one direction and then turns over the cassette and plays side B while the tape moves in the opposite direction. Thus, the invention may read bidirectionally out of memory in order to record both tracks on one pass.

After the address and direction selections are completed, the control processor 370 starts the destination medium to moving and enables the operation of appropriate DIAN modules 68. Once a DIAN module is enabled, it requests data from the request control logic 378. The request control logic 378 determines the priority of and selects between the requesting DIAN modules. Then, logic controller 378 selects the direction in which the bytes are to be read out of memory by the byte unstacker 380 and requests data from the bus control logic circuit 382. This state is maintained until the "done" signal is returned by bus control logic circuit 382. The "done" signal tells the request control logic circuit 378 that all of the data bytes have been read from a RAM (Random Access Memory) in the intermediate buffer storage circuit 64 (FIG. 2), the read out control being accomplished via buses 80 and 82. At this point, the request control logic 378 waits for the "unstack-done" command from byte unstacker 380.

Byte-by-byte, the byte unstacker 380 writes the data readout over buses 80 and 82 through a FIFO memory 368 and into the appropriate DIAN module 68. When all bytes have been unstacked, byte-unstacker 380 sends an unstack done signal to request control logic 378, thereby indicating a completion of the readout of the recorded information. Request control logic 378 then counts one address as having been done in the requesting DIAN module. From this address, the address generator may either count up or count down depending on the direction selected by the control processor 370 and given to the address generators 372–376. At this point, the request control logic circuit 376 sends an acknowledge pulse to the requesting DIAN module, which then terminates a cycle.

This data read out cycle repeats continuously until the destination medium has been completely recorded. Then, the control processor 370 stops the destination medium by sending a signal over bus 78 and simultaneously inhibits the DIAN modules that were being used. This timing, as described above, is set forth in the flow chart of FIG. 22.

When the bus control logic circuit 382 receives a request from request control logic 378, it initiates a read cycle, responsive to signals sent over buses 80 and 82 via the read and output enable lines. Then, logic circuit 382 strobes the line which causes the intermediate buffer storage circuit 64 to read stored information from memory. This state is maintained until the buffer memory storage circuit has terminated its read cycle, which is indicated by a "done" pulse sent from the intermediate buffer storage circuit to bus control logic circuit 382. Bus control logic 382 then releases the read, write, strobe, and output enable lines. A signal is sent to the request control logic circuit 378 to indicate that the cycle is done, the signal being sent via the done line. This state is maintained until the request control logic circuit 378 releases the request line "REQ" extending to bus control logic circuit 382. The sequence of events followed by the bus control logic circuit 382 is set forth in the flow diagram or FIG. 23.

FIG. 24 shows a second embodiment of a master storage controller which serves as item 40 in FIG. 2, and includes intermediate buffer storage circuit 64.

The master storage controller is similar to the destination controller of FIG. 21 in that it is controlled by the microprocessor or minicomputer 370 and request control logic 378. The logic circuit 378 has access to a plurality of master storage devices 386 which fit into the overall circuit at 44 (FIG. 2). The byte stacker 390 converts between parallel and serial data transmission, taking data from storage and sending it over a line to the intermediate buffer storage. Again, the data may be read out of storage under the control of address generator circuits.

The recorded information or audio signals are taken from the master storage devices 386, which may be disks recorded by a laser beam. There may be many such master storage disks for storing information in order to provide greater capacity. The audio signal path may be traced from the master storage devices through byte stacker 390, data drivers 391, bus 56, and intermediate buffer storage circuit 64 to an output bus 66.

In greater detail, the command to retrieve data is received via command bus 56 (FIG. 24) and stored in the control processor 370, whereupon it sets the appropriate starting addresses in each of the address generators 372–378 which are individually associated with each master storage device 386. The starting address is relative to the placement of music on the destination medium. Then, the control processor 370 resets all master storage FIFO (first in, first out) buffer memories 388 to be sure that no stray data is in them.

Once this process is completed the control processor 370 begins to send retrieve data commands to the master storage units 386. When a master storage unit begins to read data, it also latches the data, byte-by-byte, into its associated FIFO buffer memory 388. As each FIFO buffer memory reaches its half-full state, it requests service from the request control logic circuit 378. The request control logic circuit 378 determines priority among the service requesting FIFO devices. Then it sends an identification of the FIFO device with the highest current priority to the byte stacker 390, and also sends a start-to-stack signal.

Byte-by-byte, the byte-stacker 390 reads out data from the FIFO buffers 388 and latches them into its internal data register. After all bytes have been stacked, the byte stacker 390 sends the stack done signal to request control logic circuit 378, to indicate the completion of the readout. Request control logic circuit 378 then sends a request signal REQ to bus control logic circuit 382. This state is maintained until the done signal is returned from bus control logic circuit 382, to indicate to the request control logic circuit 378 that the data bytes have been written into a RAM in intermediate buffer storage via buses 80 and 82.

Then, request control logic 378 increments the storage address counter for the requesting one of the master storage devices 386. This cycle continues until all of the required data is read from the master storage devices. The timing for FIG. 24 is detailed in the flow chart of FIG. 25.

The detailed disclosure of the intermediate buffer storage circuit 64 is found in FIG. 27, which is primarily a random access memory (RAM) with peripheral control circuits. The recorded information or audio signals enter at 65 and leave at 66 in the upper left corner of the figure. During the period while the signals are in the intermediate buffer storage circuit 64, they are stored in RAM array 400. The remainder of FIG. 27 is devoted to control circuits.

More particularly, when the bus control logic circuit 382 (FIG. 24) receives a request from request control logic circuit 378, it initiates a write to memory cycle by sending write and bus enable signals over via buses 80 and 82. Then, bus control logic 382 pulses the strobe line in bus 82, which causes the intermediate buffer to write into memory. This write state is maintained until the intermediate buffer storage circuit terminates its read cycle which is indicated by a done pulse which is sent to bus control logic circuit 382. Responsive thereto, the bus control logic releases the read, write, strobe and bus enable lines and indicates to request control logic circuit 378 that the cycle is done. This state is maintained until request control logic circuit 378 releases its request line. This sequence of events for the bus control logic circuit 382 is set forth in the flow chart of FIG. 25.

The intermediate buffer storage circuit (FIG. 27) includes a state control circuit 390, a refresh control timer 392, an address decoder 394, address drivers 396, data and control drivers 398, and a large array of RAM chips 400. The state control logic circuit 390 waits for a command strobe pulse from bus control logic 382 which is transmitted via the data buses. If the command strobe pulse is given and a board select signal is received from the address decoder 394, a particular memory board is enabled in the RAM array 400. The state control logic circuit 390 then checks for the presence of a valid read or write pulse. If it is a valid read signal, the address received from the address bus is latched and the row address is sent to the addressed RAM in array 400. The addressed row is strobed via the address strobe wire (RAS) and the control decoder and drive circuit 398.

The control drive circuit 398 determines which of four banks of RAM chips is being requested by bus control logic 382, and gives an appropriate RAS signal. Next, state control logic circuit 390 gives a signal over the MUX line to change the address line drivers to the column address. The selected column address line (CAS) is strobed through the control drive circuit 398. The control decoders in circuit 398 then give the appropriate CAS signal. After the RAM access time has passed, the data returning from the RAM array is latched into the data latches 396. The done signal is given to the bus control logic 382 that is then requesting the data. A refresh cycle is inserted to retain the data in the RAM chips. This also resets timer 392 to prevent a board generated refresh. After the refresh cycle is complete, the refresh timer 394 is reset, The command strobe is released, along with all data bus drivers. The circuit has now returned to its idle state.

If a write command is received via the data buses, an address is latched in address decoder 394. The control drive circuit 398 sends data and a row address to the RAM array 400, along with the row address strobe signal (RAS). Then, control drive circuit 398 sends the column address to the RAM array along with an address strobe (CAS) and waits for a period equal to the write time of the RAM. After completion of the write cycle, the done command is sent to the requesting control logic. A refresh cycle is added to retain the memory. After the refresh cycle is complete, the refresh timer is reset and the command strobe is released, along with all data bus drivers. The circuit returns again to the idle state.

The refresh control timer 392 waits for a predetermined period of time after either a read or write request is received. If no RAM access occurs, the refresh control timer 392 requests the state control logic circuit 390 to issue a refresh cycle signal. The refresh timer maintains a continued storage of the data in the RAM chips.

A suitable RAM chip for use in this system is a 1 megabit RAM chip such as that manufactured by the Toshiba Corporation and known as a type TC511000. Because of the high data transfer rate which is possible with this form of multiple master storage devices, a RAM chip access time of 100 nanoseconds or shorter may be used. FIG. 28 is a flow chart which gives the timing for the intermediate buffer storage circuit of FIG. 27.

Those who are skilled in the art will readily perceive how to modify the system. Therefore, the appended claims are to be construed to cover all equivalent structures which fall within the true scope and spirit of the invention.

What is claimed is:

1. An information duplicating recording machine comprising:

means for providing source signals in digital form;

means for electronically buffer storing said digital source signals;

means responsive to said buffer stored digital signals for making duplicate recordings of analog signals whereby said source signals are isolated from said recorded signals;

a digital-to-analog converter means interposed between said buffer storage means and said duplicate recording means;

said digital-to-analog converter including means for calculating a substantially smooth curve envelope for said digital signals; and said digital-to-analog converter includes means for dividing a difference between successive digital samples into N-steps, and means for adding one of said steps to each of N-samples between said successive digital samples.

* * * * *